(12) United States Patent
Bazzi et al.

(10) Patent No.: US 8,649,252 B2
(45) Date of Patent: Feb. 11, 2014

(54) METHOD AND APPARATUS FOR DETERMINING A PRECODING VECTOR FOR PRECODING DATA TO BE TRANSMITTED TO A WIRELESS DEVICE IN A WIRELESS COMMUNICATION SYSTEM

(75) Inventors: Samer Bazzi, Munich (DE); Guido Dietl, Munich (DE)

(73) Assignee: NTT DoCoMo, Inc., Chiyoda-Ku, Tokyo (JP)

( * ) Notice: Subject to any disclaimer, the term of this patent is extended or adjusted under 35 U.S.C. 154(b) by 108 days.

(21) Appl. No.: 13/315,911

(22) Filed: Dec. 9, 2011

(65) Prior Publication Data

US 2012/0269077 A1    Oct. 25, 2012

(30) Foreign Application Priority Data

Apr. 21, 2011 (EP) ..................................... 11163376

(51) Int. Cl.
*H04J 11/00* (2006.01)
*H04B 7/04* (2006.01)

(52) U.S. Cl.
CPC ................................... *H04B 7/0456* (2013.01)
USPC ............................ 370/203; 370/329; 370/465

(58) Field of Classification Search
USPC ......................................... 370/203, 329, 465
See application file for complete search history.

(56) References Cited

U.S. PATENT DOCUMENTS

| | | | |
|---|---|---|---|
| 2001/0038356 A1* | 11/2001 | Frank ............................. | 343/853 |
| 2007/0248172 A1* | 10/2007 | Mehta et al. .................. | 375/260 |
| 2008/0076370 A1* | 3/2008 | Kotecha et al. ............. | 455/187.1 |
| 2010/0048233 A1* | 2/2010 | Kim et al. ...................... | 455/501 |
| 2010/0315970 A1* | 12/2010 | Ramamurthi et al. ........ | 370/252 |
| 2011/0090945 A1* | 4/2011 | Yang et al. ..................... | 375/227 |
| 2011/0211547 A1* | 9/2011 | Kim et al. ..................... | 370/329 |
| 2012/0263210 A1* | 10/2012 | Panah et al. ................... | 375/211 |
| 2012/0289267 A1* | 11/2012 | Seo et al. ...................... | 455/501 |
| 2013/0089159 A1* | 4/2013 | Liu ............................... | 375/267 |

FOREIGN PATENT DOCUMENTS

WO    WO 99/49596 A1    9/1999

OTHER PUBLICATIONS

Office Action from counterpart Russian Application No. 2011149558/07, dated Feb. 19, 2013, 8 pages (with English translation).

(Continued)

*Primary Examiner* — Jason Mattis
(74) *Attorney, Agent, or Firm* — Brinks, Gilson & Lione

(57) ABSTRACT

A method for determining a precoding vector for precoding data to be transmitted to a wireless device, includes receiving first channel state information of a channel between a first wireless device and a first base station. The first channel state information is received by the first base station from the first wireless device. The method includes receiving first channel gain information of a channel between a second wireless device and the first base station. The first channel gain information is received from the second base station. The method includes receiving a first signal strength parameter from the second base station and a first interference strength parameter from the second base station and maximizing a common signal to interference noise ratio parameter to obtain a precoding vector for precoding data to be transmitted to the first wireless device.

15 Claims, 15 Drawing Sheets

(56) References Cited

OTHER PUBLICATIONS

Berenguer, I. et al., "Multiuser TH-precoding for TDD-CDMA over multipath channels," IET Commun., vol. 1, No. 4, 2007, pp. 739-750.
Koutsopoulos, Iordanis et al., "The Impact of Space Division Multiplexing on Resource Allocation: A Unified Treatment of TDMA, OFDMA and CDMA," IEEE Transactions on Communications, vol. 56, No. 2, 2008, pp. 260-269.
LG Electronics, "Multi-layered Rate Control for SIC-based CoMP," 3GPP TSG RAN WG1 Meeting #58bis, $3^{rd}$ Generation Partnership Project, 2009, pp. 1-9.
Shi, Changxin et al., "Distributed Interference Pricing with MISO Channels," $46^{th}$ Annual Allerton Conference on Communication, Control and Computing, Sep. 23-26, IEEE, 2008, pp. 539-546.
Extended European Search Report for European Application No. 11163376.4, dated Oct. 5, 2011, 6 pages.

* cited by examiner $$C = \log\left(1 + \frac{|h_{11}^T b_1|^2}{|h_{12}^T b_2|^2 + |n_1|^2}\right) + \log\left(1 + \frac{|h_{22}^T b_2|^2}{|h_{21}^T b_1|^2 + |n_2|^2}\right)$$

- signal power $S_1$ from BS 1 : $|h_{11}^T b_1|^2$
- signal power $S_2$ from BS 2 : $|h_{22}^T b_2|^2$
- interference power $i_2$ from BS 2 : $|h_{12}^T b_2|^2$
- interference power $i_1$ from BS 1 : $|h_{21}^T b_1|^2$ First term: $SINR_1$; Second term: $SINR_2$

FIG 2

Prior Art

- - - - - → initial signaling

— · — · — → signaling phase each iteration

METHOD AND APPARATUS FOR DETERMINING A PRECODING VECTOR FOR PRECODING DATA TO BE TRANSMITTED TO A WIRELESS DEVICE IN A WIRELESS COMMUNICATION SYSTEM

RELATED APPLICATIONS

This application claims priority under 35 U.S.C. §119 to European Patent Application No. 11163376.4-1237 filed on Apr. 21, 2011, the entire content of which is hereby incorporated by reference.

Embodiments according to the invention relate to wireless communication systems and particularly to a method and an apparatus for determining a precoding vector for precoding data to be transmitted to a wireless device in a wireless communication system.

BACKGROUND OF THE INVENTION

Cellular multiuser multiple-input multiple-output (MIMO) systems are under continuous development for future wireless communication. One topic is the maximization of cell-edge user rates in interference-limited cellular systems. Inter-cell interference (ICI) is the system bottleneck for current cellular networks and many existing methods have tried to mitigate it using different techniques. Users at cell-edges mostly suffer from strong interference of neighbouring base stations and this directly reflects in lower achievable rates.

FIG. 11A shows a schematic illustration of a two-cell MISO (multiple-input single-output) system model for a MISO linear precoding. It shows two base stations BS1, BS2 covering cell 1 and cell 2 and two wireless devices UE1, UE2 (user equipment 1, user equipment 2). Further, FIG. 11B shows the direct links (useful signal) and interfering links (interference) by schematic illustration of the channels between the base stations BS1, BS2 and the wireless devices UE1, UE2, when base station 1 uses beamformer $b_1$ and base station 2 uses beamformer $b_2$.

In other words, a two-cell MISO scenario with a single user per cell is considered as shown in FIG. 11A, where each BS has M antennas and each receiver at the cell-edge has one antenna. This system model could be also considered as a two-user MISO interference channel (IC), as shown in FIG. 12, where a user in the context of ICs denotes a transmitter/receiver pair. Data symbol $s_i \sim \mathcal{N}_\mathbb{C}(0, 1)$ (i=1, 2) is linearly precoded by precoder $p_i \in \mathbb{C}^{M \times 1}$ and transmitted over the channel $h_{ii} \in \mathbb{C}^{M \times 1}$ to be received by user i. Due to the system nature, it will also be transmitted on channel $h_{ji} \in \mathbb{C}^{M \times 1}$, $j \neq i$, and received by user j as undesired interference. The transmitted signal is subject to a transmit power constraint $E[\|p_i s_i\|_2^2] = E_{tx_i}$. At the receiver side, the obtained signal is perturbed by noise $n_i \sim \mathcal{N}_\mathbb{C}(0, \sigma_i^2)$. Writing the obtained estimates of the data symbols gives:

$$\hat{s}_1 h_{11}^T p_1 s_1 + h_{12}^T p_2 s_2 + n_1$$

$$\hat{s}_2 h_{22}^T p_2 s_2 + h_{21}^T p_1 s_1 + n_2 \quad (1)$$

where $(\bullet)^T$ denotes transposition.

The most common measure that captures system performance is given by the achievable sum rate C:

$$C = \sum_{i=1}^{2} \log_2(1 + SINR_i), \quad (2)$$

where $SINR_1$ and $SINR_2$ are the received signal-to-interference noise ratios of receiver 1 and 2, respectively:

$$SINR_1 = \frac{|h_{11}^T p_1|^2}{|h_{12}^T p_2|^2 + \sigma_1^2} \quad (3)$$

$$SINR_2 = \frac{|h_{22}^T p_2|^2}{|h_{21}^T p_1|^2 + \sigma_2^2}.$$

In the following, the indices i and j where $i \in \{1, 2\}$ and $j \neq i$.

A known sum rate maximization approach is the distributed interference pricing algorithm described in "D. A. Schmidt, C. Shir, R. A. Berry, M. Honig and W. Utschick, 'Distributed Resource Allocation Schemes', IEEE Signal Processing Magazine, September 2009, pp. 53-63". This iterative method starts with each receiver announcing an interference price to interfering base stations (BSs), assuming cells with single users. In practice, each receiver feeds back these prices to its corresponding base station (BS) and the latter communicates them to other BSs; thus, BS cooperation is necessitated. The interference price of each receiver depends on the initial beamformers of the interfering BSs. Then, each BS separately performs a maximization of its corresponding user rate, taking into account the interference prices announced by other receivers and therefore it is a distributed approach. Therefore, it can be thought of as an egoistic approach subject to some penalty paid when causing interference to other users. The maximization results in new beamformers. Next, receivers update their interference prices and new beamformers are again calculated according to the updated interference prices. The process repeats until convergence.

Different approaches for mitigating interference in interference-limited systems have been considered. So far, the best approaches that have been proposed are distributed approaches, in which each transmitter tries to maximize its own rate taking into account interference prices announced by receivers in the system (C. Shi, R. A. Berry and M. Honig, "Distributed Interference Pricing with MISO Channels", in Proc. 46th Annual Allerton Conference 2008, Urbana-Champaign, Ill., September 2008, pp. 539-546 and D. A. Schmidt, C. Shir, R. A. Berry, M. Honig and W. Utschick, "Distributed Resource Allocation Schemes", IEEE Signal Processing Magazine, September 2009, pp. 53-63). Formally, interference price it represents the marginal decrease in the rate of receiver i following a marginal increase in interference caused by transmitter j, and is defined as:

$$\pi_i = -\frac{\partial u_i}{\partial I_i}, \quad (4)$$

where $u_i = \log_2(1 + SINR_i)$ is the rate of receiver i and $I_i = |h_{ij}^T p_j|^2$ is the interference power present at the receiver i (see equation 3).

Given fixed interference prices, each BS i solves the following problem:

$$p_{i,opt} = \underset{p_i}{\operatorname{argmax}}\, u_i - \pi_j |h_{ji}^T p_i|^2 \quad s.t. \quad p_i^H p_i = E_{tx_i}, i = 1, 2, \quad (5)$$

where $(\bullet)^H$ denotes conjugate transposition. The objective function of each BS can be viewed as its achievable rate minus the cost of interference it generates to other users. It is an egoistic approach that takes into consideration the penalty paid when causing interference to other users. To implement this algorithm, each receiver should announce an interference price to every interfering BS. In practice, each receiver feeds back these prices to its corresponding base station (BS) and the latter communicates them to other BSs; thus, BS cooperation is necessitated. Given these interference prices, each BS calculates its best precoder. The algorithm iteratively updates the precoders and interference prices until convergence is reached. To calculate interference prices, every receiver necessitates the knowledge of useful and interfering signal power. No precoder knowledge at the receiver side is necessary. To calculate optimal precoders, every BS i necessitates the knowledge of the channel gains $h_{ki}$, k=1, 2.

FIG. 11A shows an example for a target configuration in a downlink transmission in a multicell COMP/MIMO system (coordinated multipoint/multiple-input multiple-output system) as described by the distributed interference pricing algorithm. Cooperative beamforming can be used in order to maximize cell-edge user rates, but the closed form solution does not exist and a signaling overhead results. FIG. 13 schematically illustrates the distributed interference pricing algorithm between two base stations. First an announcement of interference prices $p_i$ penalties is transmitted by the receivers (wireless devices). The interference price represents the marginal decrease in rate for a marginal increase in interference. Then, the base stations iteratively maximize their own rate taking into account to announce prices $p_i$, which is an egoistic approach. For example, base station 1 solves the following equation:

$$\underbrace{\log(1 + SINR_1)}_{\text{Rate user 1}} + \underbrace{f(p_2)}_{\text{penalty}}$$

The cooperative beamforming jointly computes $b_1$ and $b_2$ to maximize C, but closed form solutions of beamformers do not exist and it is questionable what should be signaled and at which expense (overhead).

With this approach a signaling phase before each iteration may be used. It optimizes iteratively cell-edge user rates subject to interference penalties from neighboring cells. The interference penalties are signaled over the air link and then exchanged over the backhaul (per iteration).

FIG. 14 illustrates the initial signaling and the signaling phase of each iteration by a schematic illustration of the channels between two base stations and two wireless devices UE1, UE2. Base station 1 finds $b_1$ which maximizes the following equation:

$$\underbrace{\log(1 + SINR_1)}_{\substack{\text{Rate user 1}\\ \text{(approximated by } |h_{11}^T b_1|^2)}} - \underbrace{p_2 |h_{21}^T b_1|^2}_{\text{penalty due to interfrence}}$$

This approach has a slow convergence due to the egoistic approach, needs high computational power, is non-adaptive to fast varying systems, needs additional processing at the receiver side and additional communication via the air link (wireless link).

SUMMARY OF THE INVENTION

According to an embodiment, a method for determining a precoding vector for precoding data to be transmitted to a wireless device in a wireless communication system may have the steps of: receiving first channel state information of a channel between a first wireless device and a first base station in the wireless communication system, wherein the first channel state information is received by the first base station from the first wireless device; receiving first channel gain information of a channel between a second wireless device and the first base station, wherein the first channel gain information is received from a second base station; receiving a first signal strength parameter from the second base station indicating a signal strength at the second wireless device caused by the second base station; receiving a first interference strength parameter from the second base station indicating an interference strength at the first wireless device caused by the second base station; and maximizing a common signal to interference noise ratio parameter to acquire a precoding vector for precoding data to be transmitted to the first wireless device, wherein the common signal to interference noise ratio parameter depends on a signal to interference noise ratio at the first wireless device and a signal to interference noise ratio at the second wireless device and is based on the first channel state information, the first channel gain information, the first signal strength parameter and the first interference strength parameter.

According to another embodiment, an apparatus for determining a precoding vector for precoding data to be transmitted to a wireless device in a wireless communication system may have: a wireless receiver configured to receive a first channel state information of a channel between a first wireless device and a first base station in the wireless communication system, wherein the first channel state information is received by the first base station from the first wireless device; a wireline receiver configured to receive a first channel gain information of a channel between the second wireless device and the first base station, wherein the first channel gain information is received from a second base station, wherein the wireline receiver is configured to receive a first signal strength parameter from the second base station indicating a signal strength at the second wireless device caused by the second base station, wherein the wireline receiver is further configured to receive a first interference strength parameter from the second base station indicating an interference strength at the first wireless device caused by the second base station; and a processor configured to acquire a precoding vector for precoding data to be transmitted to the first wireless device by maximizing a common signal to interference noise ratio parameter, wherein the common signal to interference noise ratio parameter depends on a signal to interference noise ratio at the first wireless device and a signal to interference noise ratio at the second wireless device and is based on the first channel state information, the first channel gain information, the first signal strength parameter and the first interference strength parameter.

Another embodiment may have a computer program with a program code for performing the method for determining a precoding vector for precoding data to be transmitted to a wireless device in a wireless communication system, which method may have the steps of: receiving first channel state information of a channel between a first wireless device and a first base station in the wireless communication system, wherein the first channel state information is received by the first base station from the first wireless device; receiving first channel gain information of a channel between a second wireless device and the first base station, wherein the first channel gain information is received from a second base station; receiving a first signal strength parameter from the second base station indicating a signal strength at the second wireless device caused by the second base station; receiving a first interference strength parameter from the second base station indicating an interference strength at the first wireless device caused by the second base station; and maximizing a common signal to interference noise ratio parameter to acquire a precoding vector for precoding data to be transmitted to the first wireless device, wherein the common signal to interference noise ratio parameter depends on a signal to interference noise ratio at the first wireless device and a signal to interference noise ratio at the second wireless device and is based on the first channel state information, the first channel gain information, the first signal strength parameter and the first interference strength parameter, when the computer program runs on a computer or a microcontroller.

Embodiments according to the present invention are based on the central idea that a common signal to interference noise ratio parameter is maximized, which depends on a signal to noise interference noise ratio at the first wireless device and a signal to interference noise ratio at the second wireless device, so that the achievable sum rate provided to both wireless devices can be increased. By maximizing the common signal to interference noise ratio parameter, which may be for example the sum rate, the total combined data rate especially of edge users (wireless devices at the edge of a cell) can be increased, since the interference is mitigated. Further, in comparison to known approaches, less signaling between base stations and wireless devices may be used, since a pricing information from the wireless devices is not necessary. Further, a fast convergence of the algorithm can be achieved resulting in less computational effort.

In some embodiments according to the invention, the common signal to interference noise ratio parameter represents a sum rate of the first wireless device and the second wireless device, a common signal to interference noise ratio at the first wireless device and the second wireless device or a lower bound of a common signal to interference noise ratio at the first wireless device and the second wireless device.

By using a lower bound of the common signal to interference noise ratio, the computational complexity can be significantly reduced.

BRIEF DESCRIPTION OF THE DRAWINGS

Embodiments of the present invention will be detailed subsequently referring to the appended drawings, in which:

FIG. 2 illustrates a possible common signal to interference noise ratio parameter;

DETAILED DESCRIPTION OF THE PREFERRED EMBODIMENTS

Figure 1:
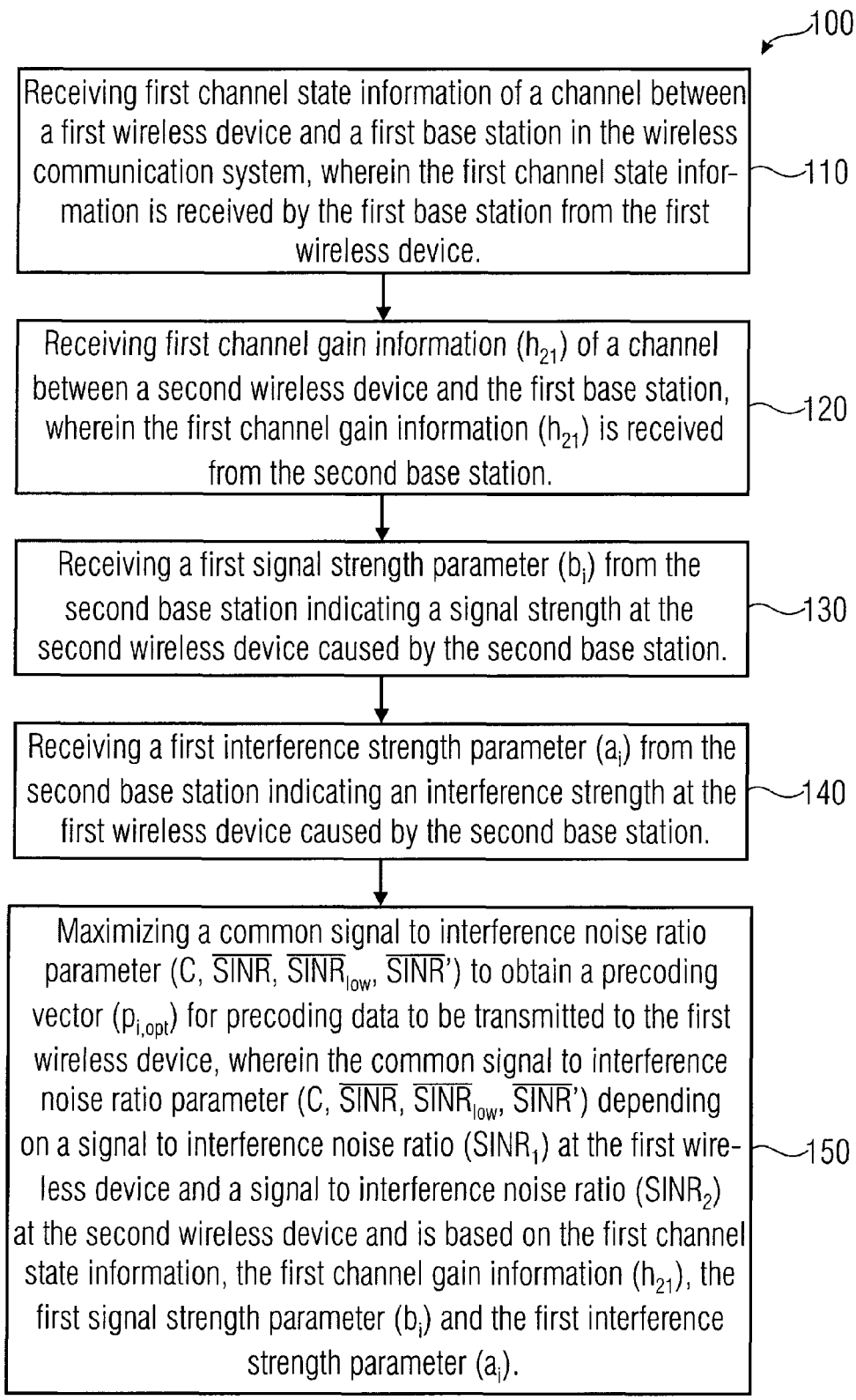
FIG. 1 is a flowchart of a method for determining a precoding vector for precoding data to be transmitted to a wireless device.

In the following, the same reference numerals are partly used for objects and functional units having the same or similar functional properties and the description thereof with regard to a figure shall apply also to other figures in order to reduce redundancy in the description of the embodiments.

FIG. 1 shows a flow chart of a method 100 for determining a precoding vector $p_{i,opt}$ for precoding data to be transmitted to a wireless device in a wireless communication system according to an embodiment of the invention. The method 100 comprises receiving 110 first channel state information of a channel between a first wireless device and a first base station in a wireless communication system. This first channel state information is received by the first base station from the first wireless device. Additionally, first channel gain information of a channel between a second wireless device and the first base station is received 120. This first channel gain information is received 120 from the second base station. Further, the method comprises receiving 130 a first signal strength parameter $b_i$ from the second base station indicating a signal strength at the second wireless device caused by the second base station and receiving 140 a first interference strength parameter $a_i$ from the second base station indicating an interference strength at the first wireless device caused by the second base station. Additionally, the method comprises maximizing 150 a common signal to interference noise ratio parameter C, $\overline{SINR}$, $\overline{SINR}_{low}$, $\overline{SINR}^l$ to obtain a precoding $p_{i,opt}$ for precoding data to be transmitted to the first wireless device. The common signal to interference noise ratio parameter C, $\overline{SINR}$, $\overline{SINR}_{low}$, $\overline{SINR}^l$ depends on a signal to interference noise ratio $SINR_1$ (signal to interference and noise ratio at the first wireless device) at the first wireless device and a signal to interference noise ratio $SINR_2$ (signal to interference and noise ratio at the second wireless device) at the second wireless device. Further, the common signal to interference noise ratio parameter C, $\overline{SINR}$, $\overline{SINR}_{low}$, $\overline{SINR}^l$ is based on the first channel state information, the first channel gain information $h_{21}$, the first signal strength parameter $b_i$ and the first interference parameter $a_i$.

By using the precoding vector obtained by using the proposed concept for precoding data for a transmission to a wireless device, the sum rate for providing data to wireless devices in the wireless communication system can be increased, since the interference at two or more wireless devices is considered for the determination of the precoding vector in a way that the sum rate is maximized. For this, channel state information is received from a first wireless device at a first base station and further information and parameters regarding one or more other wireless devices are received from one or more other base stations. With this information a maximization 150 of the common signal to interference noise ratio parameter (also called common signal to interference and noise ratio parameter) over possible precoding vectors can be realized. An interference price information as used by known methods is not necessary. Therefore, the proposed concept may use less signaling between base stations and wireless devices (through the air link or wireless channel).

Although only two base stations and wireless devices are mentioned, the described concept can also be applied to an arbitrary number of base station and wireless devices.

A wireless device is, for example, a mobile phone, a laptop or more general a user equipment UE requiring data through a wireless channel.

The proposed method 100 may be performed advantageously at the base station (e.g. at the first base station). Alternatively, the maximization 150 is performed by a central controller receiving the first channel gain information, the first signal strength parameter and the first interference strength parameter. In this case, the first base station may use the first channel state information and the second channel state information to calculate channel gain information of a channel $h_{11}$ between the first wireless device and the first base station and transmit this channel gain information to the central controller. Alternatively, the first channel state information may be transmitted to the central controller and the corresponding channel gain information may be calculated by the central controller.

For example, a channel state information is obtained by a channel vector quantization at the wireless device and comprises a codebook entry together with a channel quality indicator representing an SINR value (signal to interference and noise ratio value). Based on the first channel state information, a channel gain information $h_{11}$ of a channel between the first wireless device and the first base station can be computed. This channel gain information may be a parameter of the common signal to interference noise ratio parameter, so that the common signal to interference noise ratio parameter is based on the first channel state information through this channel gain information.

The first channel gain information $h_{21}$, the first signal strength parameter $b_i$ and the first interference strength parameter $a_i$ may be received through a wireline channel from the second base station (through the backhaul of the wireless communication system). In contrast, the first channel state information is received through a wireless channel (air link) from the first wireless device. Therefore, the useful data exchange through the wireless channel can be kept low or reduced compared with known methods, since the first channel gain information, the first signal strength parameter and the first interference strength parameter are exchanged through the backhaul of the wireless communication system.

In connection with the proposed concept, a signal strength parameter may indicate in general a signal strength at a wireless device caused by a base station responsible for wireless device (the wireless device is assigned to the base station), when a precoding vector is used, which is used for the calculation of the signal strength parameter. For example, the signal strength parameter comprises a large value for high signal strength and a low value for low signal strength. Further, an interference strength parameter may indicate in general an interference strength at a wireless device caused by a base station not responsible for the wireless device (the wireless device is assigned to another base station), when a precoding vector is used, which is used for the calculation of the interference strength parameter. For example, the interference strength parameter comprises a large value for high interference strength and a low value for low interference strength. Further, an interference strength parameter may indicate not only an interference strength but (a sum of) an interference strength and a noise strength at the wireless device.

The first channel gain information $h_{21}$, the first signal strength parameter $b_i$ and the first interference strength parameter $a_i$ may be calculated by the second base station before they are transmitted to the first base station. For calculating the first channel gain information $h_{21}$, the first signal strength parameter $b_i$ and/or the first interference strength parameter the second base station may use a channel gain information of a channel between the first wireless device and the second base station. Therefore, method 100 may further comprise receiving second channel state information of a channel between the first wireless device and a second base station in the wireless communication system. The second channel state information may be received by the first base station from the first wireless device. Further, a second channel gain information of the channel between the first wireless device and the second base station may be calculated based on the second channel state information and the second channel gain information $h_{12}$ may be transmitted to the second base station. This may be done by the first base station or the central controller in an alternative implementation mentioned above.

In some embodiments according to the invention, the second base station may also perform the method according to the described concept. In this way, both base stations can determine a precoding vector for precoding data to be transmitted to a wireless device assigned to the respective base station by receiving channel state information (first channel state information) from the respective assigned wireless device and receive first channel gain information, a first signal strength parameter and a first interference strength parameter from the other base station.

For this, the base station calculates a signal strength parameter indicating a signal strength at the assigned wireless device caused by itself and an interference strength parameter indicating an interference strength at the other wireless device caused by itself and transmit the calculated signal strength parameter and the calculated interference strength parameter to the other base station.

In other words, consistent with the wording above, the method may further comprise calculating a second signal strength parameter $b_i$ indicating a signal strength at the first wireless device caused by the first base station and calculating a second interference strength parameter $a_i$ indicating an interference strength at the second wireless device caused by the first base station. The method may further comprise transmitting the second signal strength parameter $b_i$ and the second interference strength parameter $a_i$ to the second base station. In this way, both base stations can determine a precoding vector by maximizing a common signal to interference noise ratio parameter, so that the achievable sum rate of data to be transmitted to the wireless devices can be increased.

Further, with this approach an iterative optimization of the determined precoding vector can be realized, since each base station can calculate a new interference strength parameter and a new signal strength parameter based on the previously determined precoding vector and transmit them to the other base station.

In other words, consistent with the wording above, the method may further comprise receiving a third signal strength parameter and a third interference strength parameter $a_i$ from the second base station. The third signal strength parameter $b_i$ may be calculated by the second base station based on the transmitted second signal strength parameter $b_i$ and the transmitted second interference strength parameter $a_i$. Further, the third signal strength parameter $b_i$ may indicate a signal strength at the second wireless device caused by the second base station under consideration of the transmitted second signal strength parameter $b_i$ and the transmitted second interference strength parameter $a_i$. The third interference strength parameter $a_i$ may be calculated by the second base station based on the transmitted second signal strength parameter $b_i$ and the second interference strength parameter $a_i$. Further, the third interference strength parameter $a_i$ may indicate an interference strength at the first wireless device caused by the second base station under consideration of the transmitted second signal strength parameter $b_i$ and the transmitted second interference strength parameter $a_i$. Additionally, a new precoding vector may be obtained by maximizing the common signal to interference noise ratio parameter, which is now based on the first channel state information, the first channel gain information, the third signal strength parameter and the third interference strength parameter, so that the precoding vector can be optimized iteratively.

In this way, the common signal to interference noise ratio parameter still also depends on the first signal strength parameter and the first interference strength parameter, since the third signal strength parameter and the third interference strength parameter are calculated based on the second signal strength parameter and the second interference strength parameter, which are calculated based on the first signal strength parameter and the first interference strength parameter.

In some embodiments according to the invention the common signal to interference noise ratio parameter may represent a sum rate C of the first wireless device and the second wireless device, a common signal to interference noise ratio $\overline{SINR}$ at the first wireless device and the second wireless device or a lower bound of the common signal to interference noise ratio $\overline{SINR}_{low}$ at the first wireless device and the second wireless device.

In the following, a detailed example for a method for determining a precoding vector according to the proposed concept is described. The described features may be used together or may be used independent from each other in combination with the basic concept described above. In connection with the detailed example, the proposed concept may also be seen as a direct maximization of the system sum rate with base station cooperation via exchange of interference powers. Some of the explanations below relate to a system with two base stations and two wireless devices, however the applicability of the proposed concept is not limited to such a system and can also be applied to an arbitrary number of base stations and wireless devices.

FIG. 2 shows a general example for a sum rate between two base stations and two wireless devices with an indication of the signal powers $S_1, S_2$ (signal strength) and the interference powers $I_1, I_2$ (interference strength) of the two base stations BS1, BS2. In the following, the signal powers $S_1, S_2$ and the signal strength parameter $b_i$ may be equal quantities, the interference powers $I_1, I_2$ and the interference strength parameter $a_i$ may be equal quantities and the beamformers $b_1, b_2$ and the precoding vectors $p_1, p_2$ may be equal quantities.

A direct maximization of the main objective function (see equation 2) is proposed, assuming the BSs can exchange precoder information (this assumption will be relaxed later). To that end, equation 2 is rewritten as:

$$C = \log_2((1 + SINR_1)(1 + SINR_2)) \quad (6)$$
$$= \log_2(1 + SINR_1 + SINR_2 + SINR_1 SINR_2)$$
$$= \log_2(1 + \overline{SINR}),$$

where $\overline{SINR}$ is the equivalent SINR of a corresponding single-cell single user system achieving the same rate (e.g. one possible common signal to interference noise parameter). Since the logarithm function is monotonic, maximizing equation 6 is equivalent to maximizing its argument. Thus, the problem of finding the optimal precoders $(p_1, p_2)_{opt}$ can be formulated as follows:

$$(p_1, p_2)_{opt} = \underset{(p_1, p_2)}{\mathrm{argmax}} \; \overline{SINR} \; s.t. \; p_i^H p_i = E_{tx_i}, i = 1, 2. \quad (7)$$

Each term of $\overline{SINR}$ (e.g. one possible common signal to interference noise parameter) contains expressions of $p_1$ and $p_2$, making the problem structure a complicated one. Thus, a closed form expressions for the optimal precoders may not be available. Therefore, an alternating optimization approach can be followed to find (sub)optimal precoder values. Assume BS i wants to find its optimal precoder $p_i$ given the knowledge of the precoder of BS j, $p_j$. First, $SINR_i$ and $SINR_j$ are rewritten as $$SINR_i = \frac{p_i^H h_{ii}^* h_{ii}^T p_i}{|h_{ij}^T p_j|^2 + \sigma_i^2} \quad (8)$$

$$SINR_j = \frac{|h_{jj}^T p_j|^2}{p_i^H h_{ji}^* h_{ji}^T p_i + \sigma_j^2},$$

and define scalars $a_i$ and $b_i$ as $$a_i = |h_{ij}^T p_j|^2 + \sigma_i^2$$

$$b_i = |h_{jj}^T p_j|^2. \quad (9)$$

$a_i$ and $b_i$ represent the interference-plus-noise power present at receiver and the useful signal power of receiver j, respectively, which are known and fixed for a certain value of $p_j$. Using these quantities, equation 8 can be rewritten as:

$$SINR_{ii} = \frac{p_i^H h_{ii}^* h_{ii}^T p_i}{a_i} = p_i^H A_i p_i \quad (10)$$

$$SINR_j = \frac{b_i}{p_i^H h_{ji}^* h_{ji}^T p_i + \sigma_j^2} = \frac{1}{p_i^H B_i p_i},$$

where $A_i$ and $B_i$ are the positive-definite matrices given by:

$$A_i = \frac{h_{ii}^* h_{ii}^T}{a_i} \quad (11)$$

$$B_i = \frac{h_{ji}^* h_{ji}^T + \frac{\sigma_j^2}{E_{tx_i}} I_M}{b_i},$$

where the equality $p_i^H p_i = E_{tx_i}$ has been used to obtain the expression for $B_i$ and $I_M$ is the identity matrix of size M.

Then, it is easily seen that the objective function $\overline{SINR}$ of equation 7 can be solely written in terms of precoder $p_i$ as follows:

$$\overline{SINR} = p_i^H A_i p_i + \frac{1}{p_i^H B_i p_i} + \frac{p_i^H A_i p_i}{p_i^H B_i p_i} \quad (12)$$

$$= \frac{p_i^H A_i p_i p_i^H B_i p_i + 1 + p_i^H A_i p_i}{p_i^H B_i p_i}$$

$$= \frac{p_i^H \left( A_i p_i p_i^H B_i + \frac{1}{E_{tx_i}} I_M + A_i \right) p_i}{p_i^H B_i p_i}$$

$$= \frac{p_i^H D_i p_i}{p_i^H B_i p_i},$$

where the positive-definite matrix $D_i$ is implicitly defined. This looks similar to a Rayleigh quotient, whose maximizing value is given by the generalized eigenvector corresponding to the maximum generalized eigenvalue (GEV) of matrices $D_i$ and $B_i$. However, $D_i$ itself is a function of $p_i$, and this prevents the usage of the GEV approach. In the following, we two approaches are proposed that simplify $\overline{SINR}$ and provide feasible solutions to the problem at hand. Both approaches relate to a lower bounding of the objective function (e.g. the common signal to interference noise parameter). Noting that $$p_i^H B_i p_i = \frac{p_i^H h_{ji}^* h_{ji}^T p_i + \sigma_j^2}{b_i} \quad (13)$$

$$= \frac{|h_{ji}^T p_i|^2}{b_i} + \frac{\sigma_j^2}{b_i}$$

$$\geq \frac{\sigma_j^2}{b_i}$$

with equality if $p_i$ is the zero-forcing solution, this allows to lower bound $\overline{SINR}$ (e.g. one possible common signal to interference noise parameter) as:

$$\overline{SINR} = \frac{p_i^H A_i p_i p_i^H B_i p_i + 1 + p_i^H A_i p_i}{p_i^H B_i p_i} \quad (14)$$

$$\geq \frac{p_i^H \left( \frac{\sigma_j^2}{b_i} A_i + \frac{1}{E_{tx_i}} I_M + A_i \right) p_i}{p_i^H B_i p_i}$$

$$= \frac{p_i^H \left( \left(1 + \frac{\sigma_j^2}{b_i}\right) A_i + \frac{1}{E_{tx_i}} I_M \right) p_i}{p_i^H B_i p_i}$$

$$= \frac{p_i^H D_{low,i} p_i}{p_i^H B_i p_i}$$

$$= \overline{SINR}_{low},$$

where the positive-definite matrix $D_{low,i}$ is implicitly defined. Note that this matrix is independent of $p_i$; thus, the GEV approach can be used to solve the problem. The main problem has been changed since $\overline{SINR}_{low}$—a lower bound for $\overline{SINR}$—is maximized instead of directly maximizing $\overline{SINR}$. This lower bound depends on bi; thus it is variable and changes with every iteration. The optimal $p_i$ can be found as the generalized eigenvector corresponding to the maximum generalized eigenvalue $\lambda_{max}$ of matrices $D_{low,i}$ and $B_i$:

$$D_{low,i} p_{i,opt} = \lambda_{max} B_i p_{i,opt}. \quad (15)$$

Having found $p_{i,opt}$, BS j can now use this updated value to find $p_{j,opt}$ using the same procedure as above and this repeats until convergence. The details of this method are listed in the following Algorithm.

---

Algorithm 1 Maximizing a lower bound on the system sum rate $p_1 \leftarrow p_{1,noncoop}$, $p_2 \leftarrow p_{2,noncoop}$
$C_{old} \leftarrow C(p_1, p_2)$ [cf. (2) and (3)]
for iter = 1 : max_nb_iterations do
  for i = 1, 2 do
    j ← 3 − i
    compute $a_i = f(p_j)$, $b_i = f(p_j)$, $A_i = f(a_i)$, $B_i = f(b_i)$ and $N_{low,i}$
    update $p_i$ [cf. (15)]
  end for
  compute $C_{new} \leftarrow C(p_1, p_2)$
  if $\frac{C_{new} - C_{old}}{C_{old}} < \epsilon$ then
    break
  else $C_{old} \leftarrow C_{new}$
  end if
end for

---

The algorithm starts with initial values $p_{1,noncoop}$ and $p_{2,noncoop}$ which represent the precoder values in case no cooperation takes place; i.e. each BS tries to maximize its own sum rate independently of the other BS. In the main loop, new values of $p_1$ and $p_2$ are calculated according to the proposed approach at each iteration. The algorithm runs for a maximum of max_nb_iterations iterations if convergence has still not been achieved, and variable $\epsilon$ can be set according to the desired convergence accuracy.

The problem with $\overline{SINR}$ is in the $p_i^H A_i p_i p_i^H B_i p_i$ term, which prevents from obtaining known analytical solution. In the previous approach, this term was lower bounded, transforming it to a second-order valued problem where feasible solutions can be obtained. Let $p_i^n$ denote the obtained precoder solution after the n-th iteration and assume $p_i^{n+1}$ is now searched for. Another possible way to calculate $p_i^{n+1}$ would be to approximate $p_i^{H,n+1} A_i p_i^{n+1} p_i^{H,n+1} B_i p_i^{n+1}$ with either $p_i^{H,n} A_i p_i^n p_i^{H,n+1} B_i p_i^{n+1}$ or $p_i^{H,n+1} A_i p_i^{n+1} p_i^{H,n} B_i p_i^n$. For example, the first approach is considered and note that $p_i^n$ is given, this implies that $p_i^{H,n} A_i p_i^n$ is now constant. Effectively, we would be actually neglecting the SINR$_i$ term (see equation 11 and 12) and solving the following sub-problem:

$$P_{i,opt} = \underset{p_i}{\arg\max} \underbrace{SINR_j + SINR_iSINR_j}_{\overline{SINR'}} \quad s.t. \quad p_i^H p_i = E_{tx_i}. \quad (16)$$

Note that $\overline{SINR'}$ (e.g. one possible common signal to interference noise parameter) is actually another lower bound for $\overline{SINR}$. The new objective function can be rewritten as $$\overline{SINR'} = \frac{1}{p_i^H B_i p_i} + \frac{p_i^H A_i p_i}{p_i^H B_i p_i} \quad (17)$$

$$= \frac{p_i^H \left(A_i + \frac{1}{E_{tx_i}} I_M\right) p_i}{p_i^H B_i p_i}$$

$$= \frac{p_i^H D_i' p_i}{p_i^H B_i p_i},$$

where the iteration index is omitted for simplicity. Since $D'_i$ is positive-definite then $p_{i,opt}$ is given by the generalized eigenvector corresponding to the maximum eigenvalue of matrices $D'_i$ and $B_i$. Comparing the matrix $D_{low,i}$ from the previous approach with $D'_i$, it is seen that the only difference lies in the additional $$\frac{\sigma_j^2}{b_i} A_i$$

term present in $D_{low,i}$. At high SNR (signal to noise ratio), $\sigma_j^2 \to 0$ and consequently, $D_{low,i} \to D'_i$; thus the two approaches are expected to yield similar solutions.

The implementation of the proposed algorithm may utilize the knowledge of the channel gains $h_{ki} \forall k=1, 2$ at BS i. In addition, scalar quantities $a_i$ and $b_i$ need to be available. These scalars depend on $p_j$ (see equation 9); thus, they can be calculated at BS j and communicated back to BS i instead of directly communicating $p_j$, leading to a reduced signaling overhead. One basic difference between the proposed approach and the state-of-the-art approaches—besides the chosen optimization function—is in the information that is being exchanged between BSs: the state-of-the-art exchanges pricing information while the proposed approach exchanges interference powers $a_i \forall i$ (see equation 9), assuming a decentralized system. In comparison with the state-of-the-art approach, exchange of one additional scalar—$b_i$—between BSs is necessitated, resulting in additional signaling overhead between the BSs, but no processing at the receiver (calculation of interference prices) is required. Moreover, the interference prices need to be fed-back from the receiver side to the BS side first, resulting in additional overhead between the receivers and BSs for the state-of-the-art approaches. This overhead reduces the available bandwidth for transmission.

Figure 3:
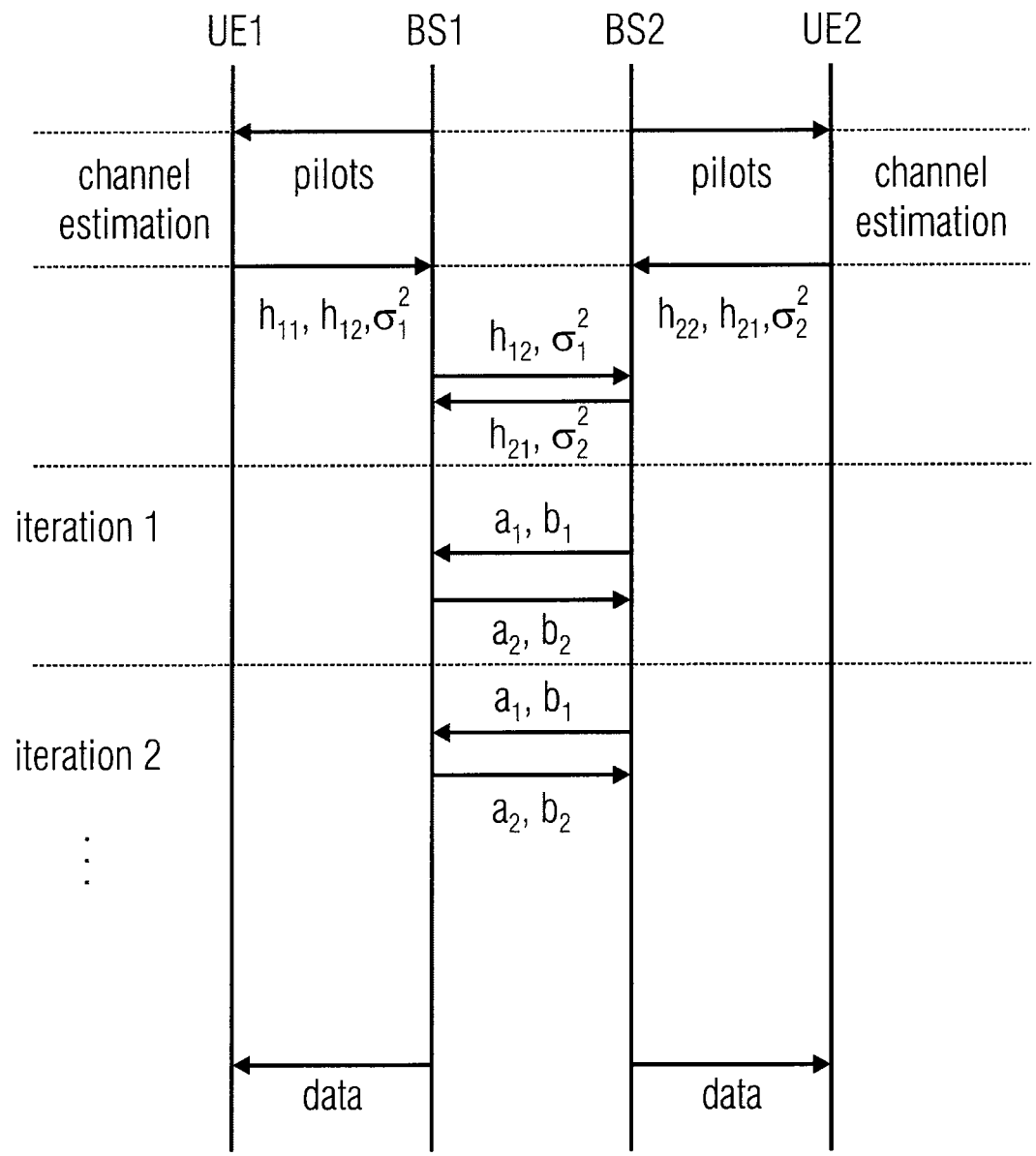
FIG. 3 is a schematic diagram showing the signaling using the proposed approach.
Figure 15:
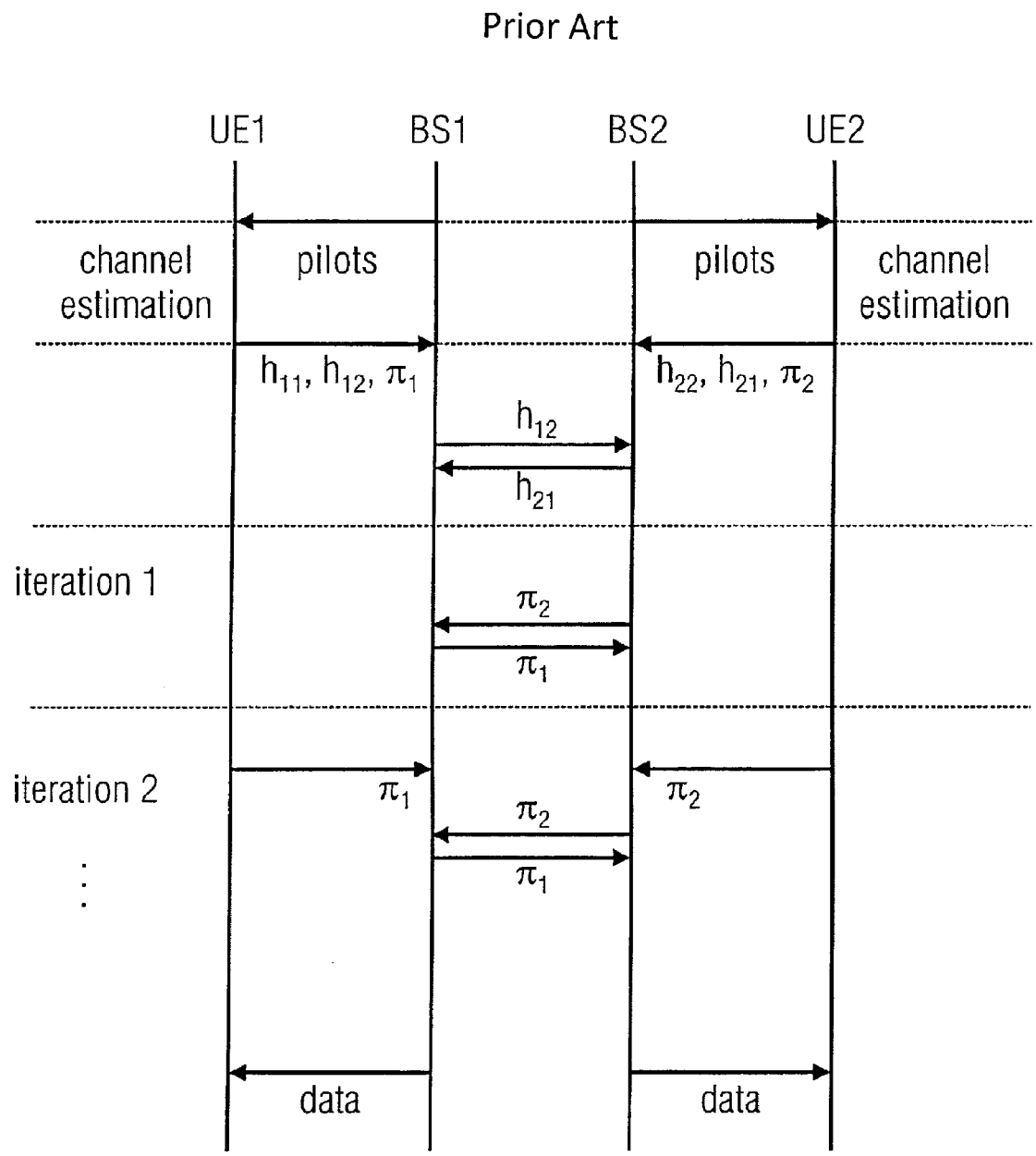
FIG. 15 is a schematic diagram showing the signaling using the known interference price based approach.

FIG. 3 shows the signaling that may be used for the proposed method. The initialization phase starts with pilot symbols sent to receivers, which estimate their channels and send them back (the first channel state information, e.g. codebook entry and channel quality indicator, FIG. 3 shows the parameters $h_{11}, h_{12}, \sigma_1^2$ derived by the base station from the channel state information) to the corresponding BSs along with their estimated noise powers (this assumption will be relaxed later). Then, the BSs exchange useful information (e.g. channel gain information $h_{ij}$ and noise $\sigma_i^2$) before the algorithm starts. After convergence, data transmission can start. For a two-cell system, the total signaling overhead is identical (similar). Using the state-of-the-art approach, the pricing scalar is fed back to the corresponding BS, which at its turn communicates it to the interfering BS, resulting in signaling of 2 scalar values, as shown in FIG. 15 (neglecting the channel signaling for now). The proposed approach directly exchanges the 2 scalar values $a_i$ and $b_i$ between BSs (it can be safely assumed that the noise power density is similar for different receivers in the system; thus, no noise powers need to be fed-back from the receivers to BSs then exchanged between BSs). The signaling dedicated for the channels is also identical, as shown in both figures. Note that the feedback of interference prices is done via the air link, which is less reliable; thus, any small inaccuracies in the fed-back values can have a big effect on the obtained state-of-the-art solutions. On the other hand, exchange of scalars using the proposed method is done via fiber links (where bandwidth is not an issue) and is more reliable. This discussion assumes no quantization: in that case, it would be hard to figure out which method has less signaling since this depends on the codebook sizes of both the precoders and interference prices. Finally, as seen from the diagrams, iterations using the proposed scheme may not need any fed-back information from the receivers and only information between BSs is exchanged, in contrast to the state-of-the-art method where the updated pricing information $\pi_1$ and $\pi_2$ need to be fed-back from the receivers at each iteration. This makes the proposed algorithm suitable for centralized systems, for example.

As will be provided later in the simulation results, the proposed algorithm has a very fast convergence speed. This results in a big decrease in computational power involved and is economically desirable. Moreover, the proposed algorithm is also well-suited for decentralized systems with fast-varying channels, because only limited signaling may be used, keeping in mind that each iteration necessitates a signaling phase. State-of-the-solutions necessitate a lot of iterations and thus a lot of signaling.

Figure 4:
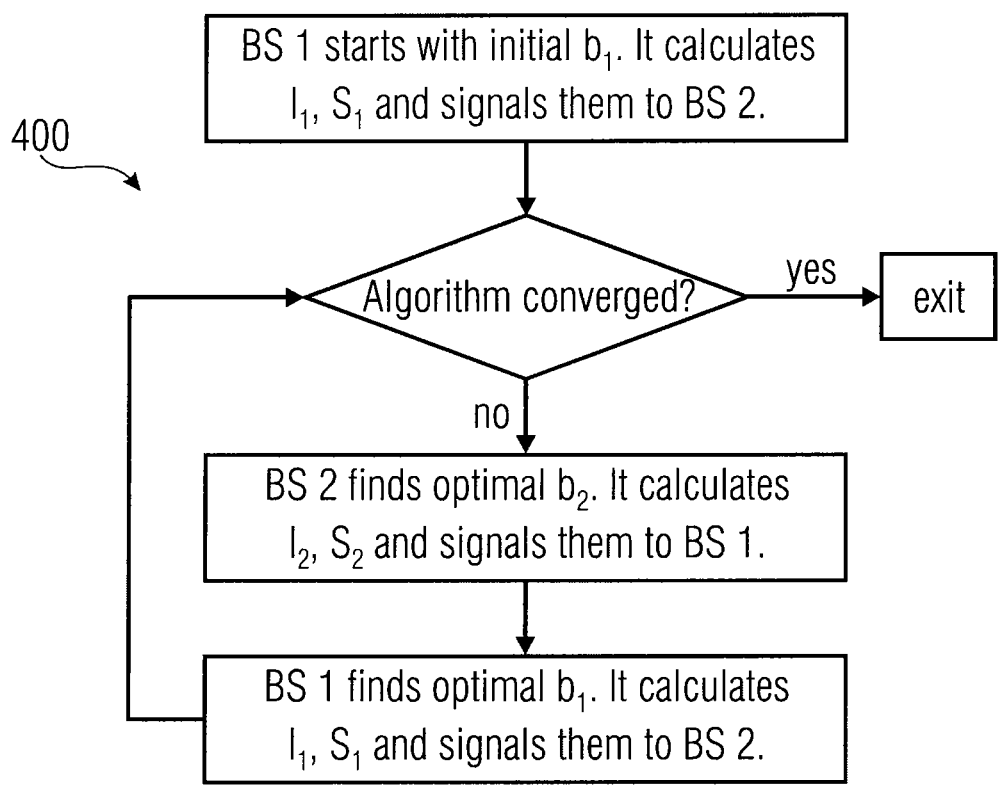
FIG. 4 shows a flowchart of a method for determining a precoding vector for precoding data to be transmitted to a wireless device.

FIG. 4 shows a flow chart of a method 400 for determining a precoding vector for precoding data to be transmitted to a wireless device according to an embodiment of the invention. This example is similar to algorithm 1 described above and indicates the cooperation of two base stations according to the described concept.

In this example a first base station starts with initially calculating a precoding vector $b_1$ ($p_1$) and calculates a first signal strength parameter $I_1$ ($b_i$) and a first interference strength parameter $S_1$ ($a_i$) (which is done by the second base station in the example shown by FIG. 1 and described by the corresponding description) and signals them to the second base station BS2 (which is the first base station shown in FIG. 1). Then the second base station BS2 (the first base station in FIG. 1) maximizes a common signal to interference noise ratio parameter for finding an optimal precoding vector $b_2$ ($p_2$) based on the first signal strength parameter $I_1$ and the first interference strength parameter $S_1$. Further, it calculates a second signal strength parameter $I_2$ ($b_i$) and a second interference strength parameter $S_2$ ($a_i$) and signals them to the first base station BS1 (the second base station in the example of FIG. 1).

Next, base station BS1 (the second base station in the example of FIG. 1) maximizes the common signal to interference noise ratio parameter based on the second signal strength parameter $I_2$ and the second interference strength parameter $S_2$ to find an optimal precoding vector $b_1$. Further, it calculates a third signal strength parameter $I_1$ ($b_i$) and a third interference strength parameter $S_1$ ($a_i$) and signals them to the second base station BS2 (which is the first base station in the example of FIG. 1).

If the new precoding vector fulfills a predefined interruption $$\frac{C_{new} - C_{old}}{C_{old}} < \epsilon$$

criterion or a maximal number of iterations is reached, the algorithm stops and the precoding vectors calculated last at the first base station and the second base station are used for precoding data to be transmitted to the wireless devices.

The reception of the first channel state information of the wireless device at the base station as well as the reception of the first channel gain information are not illustrated in this schematic algorithm, although these steps are also performed.

By using this iterative approach, the sum rate for transmitting data to the wireless devices can be iteratively optimized without requiring further information from the wireless devices (as for example, the interference prices by known concepts), so that the useful wireless signaling can be kept low. However, the wireless rates (i.e. achievable rates of different users) are higher when compared to existing schemes.

The illustration of the algorithm in FIG. 4 is equivalent to the algorithm illustrated in FIG. 3. Only the indices are slightly different. For example, the precoding vector is indicated by $b_i$ instead of $p_i$, the signal strength parameter (or signal power parameter) by $S_i$ instead of $a_i$ and the interference strength parameter (or interference power parameter) by $I_i$ instead of $b_i$.

Figure 5:
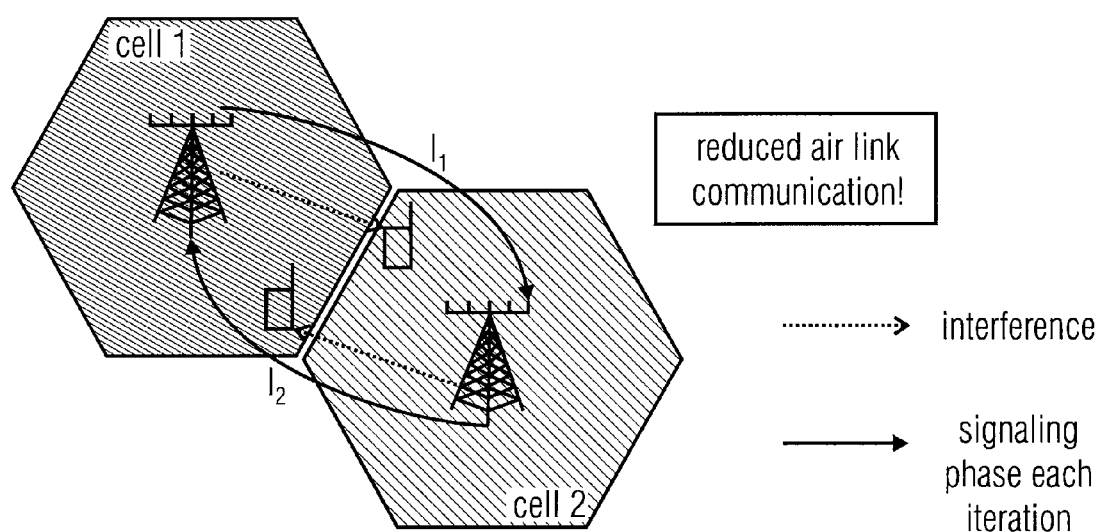
FIG. 5 is a schematic illustration of two cells in a wireless communication system using the proposed concepts.

Further, FIG. 5 shows a schematic illustration of two cells of a wireless communication system with base stations causing interference for cell-edge users in the other cell and the signaling of the interference strength parameter $I_1$, $I_2$ during the signaling phase in each iteration. This is done through a wireline link between the base stations, so that the air link communication can be reduced.

It illustrates the new signaling scheme which may enable the base stations to calculate the own-caused interference power I. In this way, the base stations may be able to maximize C cooperatively via interference power exchange:

$C=\log(1+SINR_1)+\log(1+SINR_2)=f(I_1,I_2)$.

Figure 6:
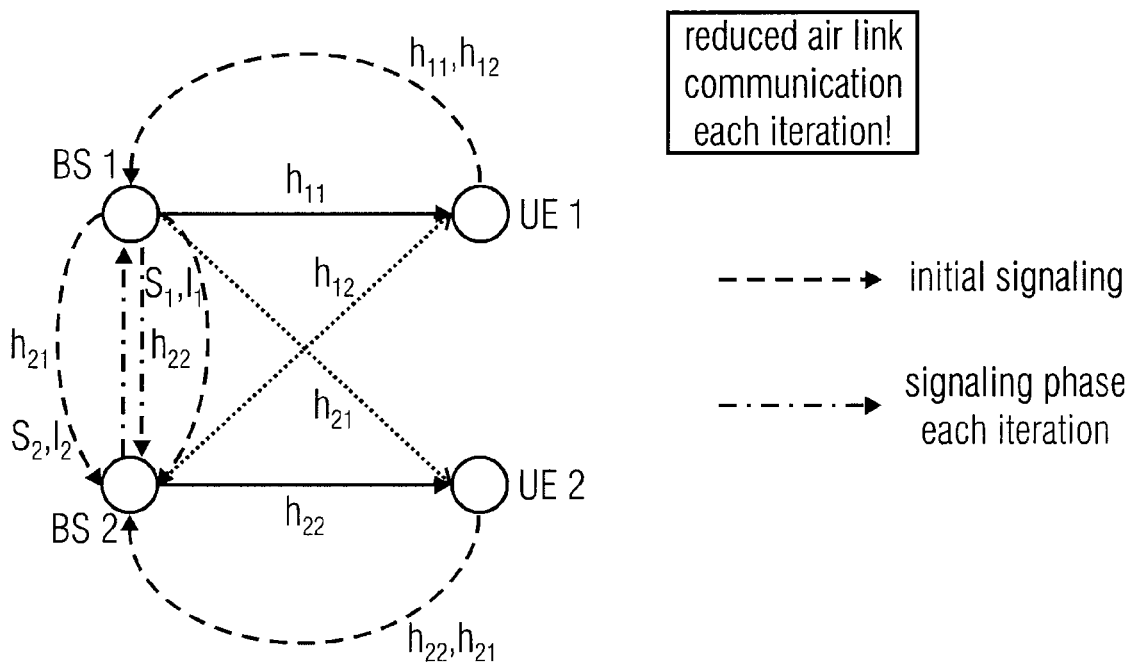
FIG. 6 is a schematic illustration of channels and communication between two base stations and two wireless devices using the proposed concept.

Corresponding to the algorithm shown in FIG. 4 and the schematic illustration of the 2-cell scenario in FIG. 5, FIG. 6 shows a schematic illustration (signaling diagram) of the channels and the data to be exchanged between two base stations and two wireless devices, when using the proposed concept. By initially signaling the channel state information from the wireless devices to the base stations, the base stations can calculate channel gain information for the different channels between the base stations and the wireless devices. Afterwards, during the signaling phase at each iteration, only a wireline link between the base stations may be used, so that the (useful) air link communication (data) can be reduced at each iteration.

Figure 7:
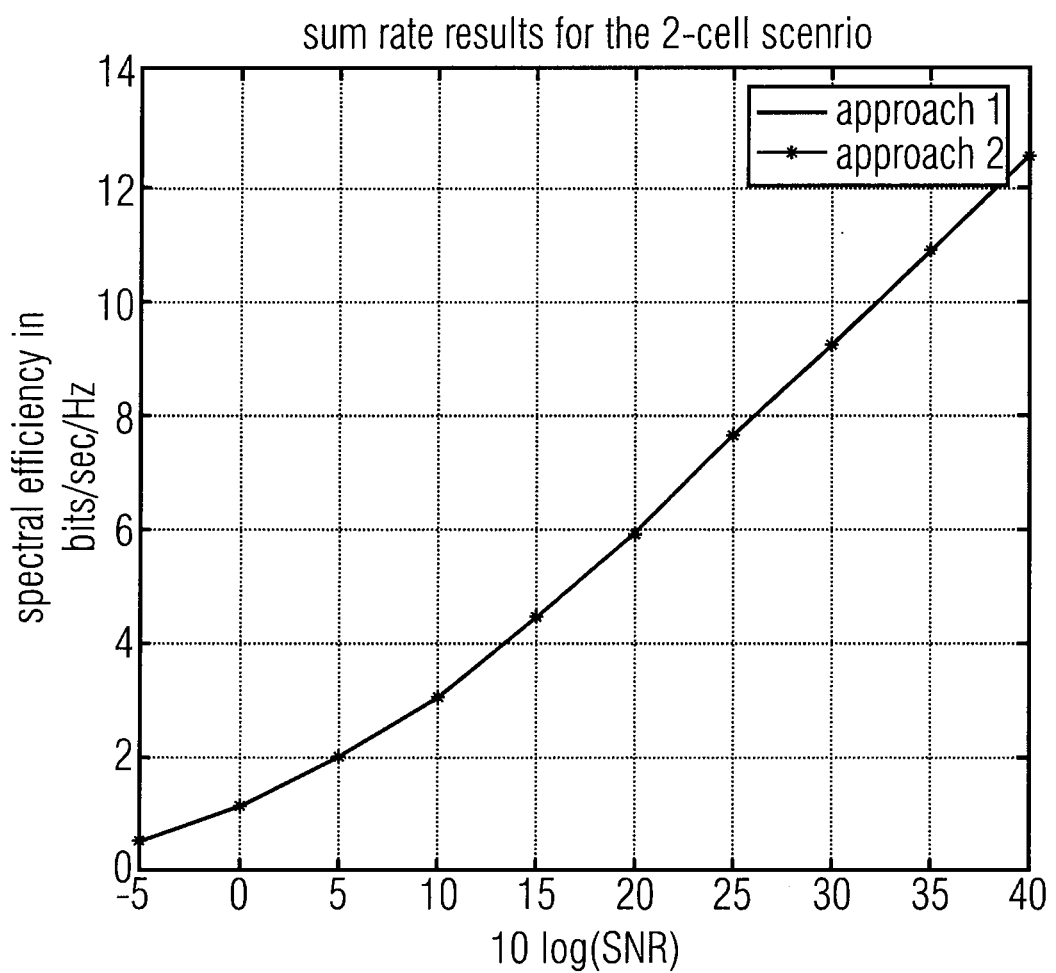
FIG. 7 shows a diagram comparing different approaches for considering a lower bound of the objective function.
Figure 8:
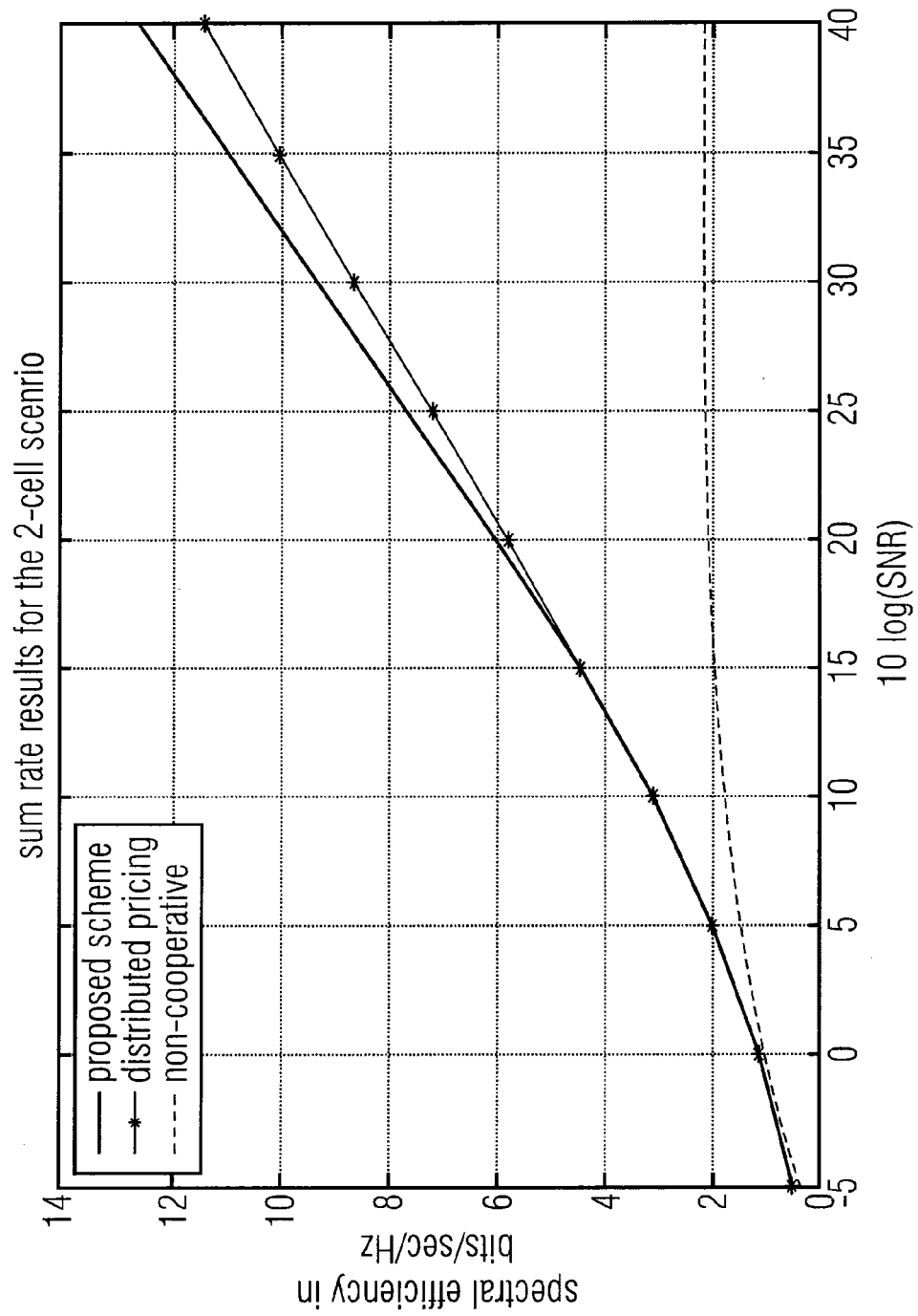
FIG. 8 shows a diagram indicating the rate results for cell-edge users.

Simulation results are averaged over 5000 independent and identically distributed (IID) channel realizations with mean 0 and covariance matrix I for both direct and interfering links. This captures the performance at cell edge, where a user suffers from interference as strong as the useful signal. The transmit power $E_{tx_i}$ was set to 1, $\forall i$. M=2 antennas were employed at each BS. FIG. 7 compares both proposed (lower bounding) approaches, where approaches refer to the method with $\overline{SINR}$ and refer to the method with $\overline{SINR}'$, respectively. The method which maximizes a lower bound performs slightly better at low SNR, with both methods yielding similar solutions as the SNR increases, as expected. One of the lower bound approach is used in the subsequent simulations. FIG. 8 compares the proposed approach with the distributed pricing approach. For low SNR, the distributed pricing approach performs slightly better. The proposed approach outperforms the distributed approach starting with an SNR ~12 dB. The proposed approach achieves significant spectral efficiency (and subsequently rate) gains with increasing SNR.

Figure 9:
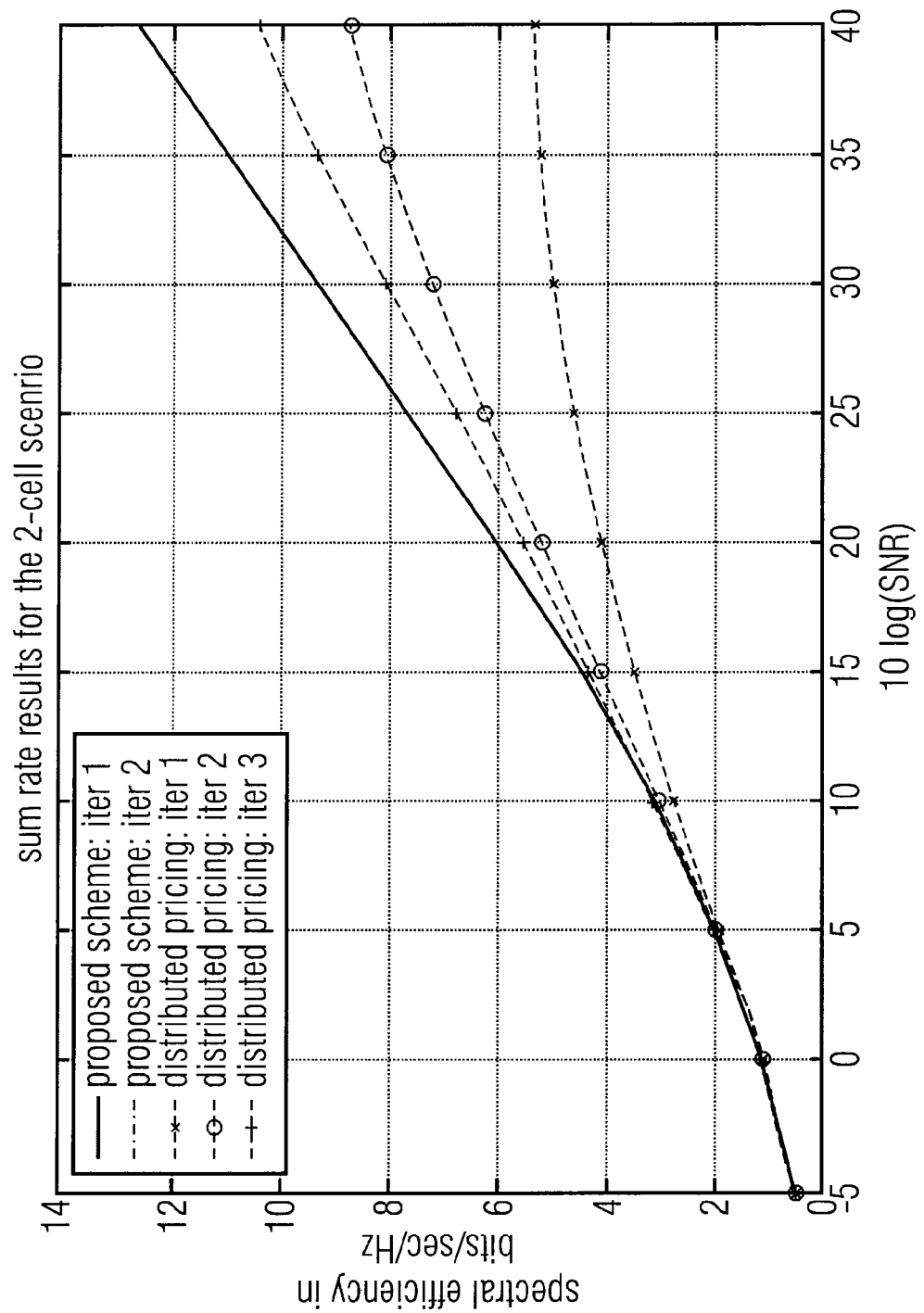
FIG. 9 is a diagram indicating convergence plots.

FIG. 9 shows the number of iterations that may be used by the proposed approach and the distributed pricing approach to reach convergence. As seen from the plot, the proposed scheme converges more or less directly after the first iteration, as subsequent iterations only provide negligible improvements. The distributed pricing approach necessitates a bigger number of iterations to converge. This is due to the fact that the proposed scheme in this example directly maximizes a lower bound on the sum of cell-edge user rates, while the distributed approach maximizes different objective functions separately and this makes convergence slower.

Figure 10:
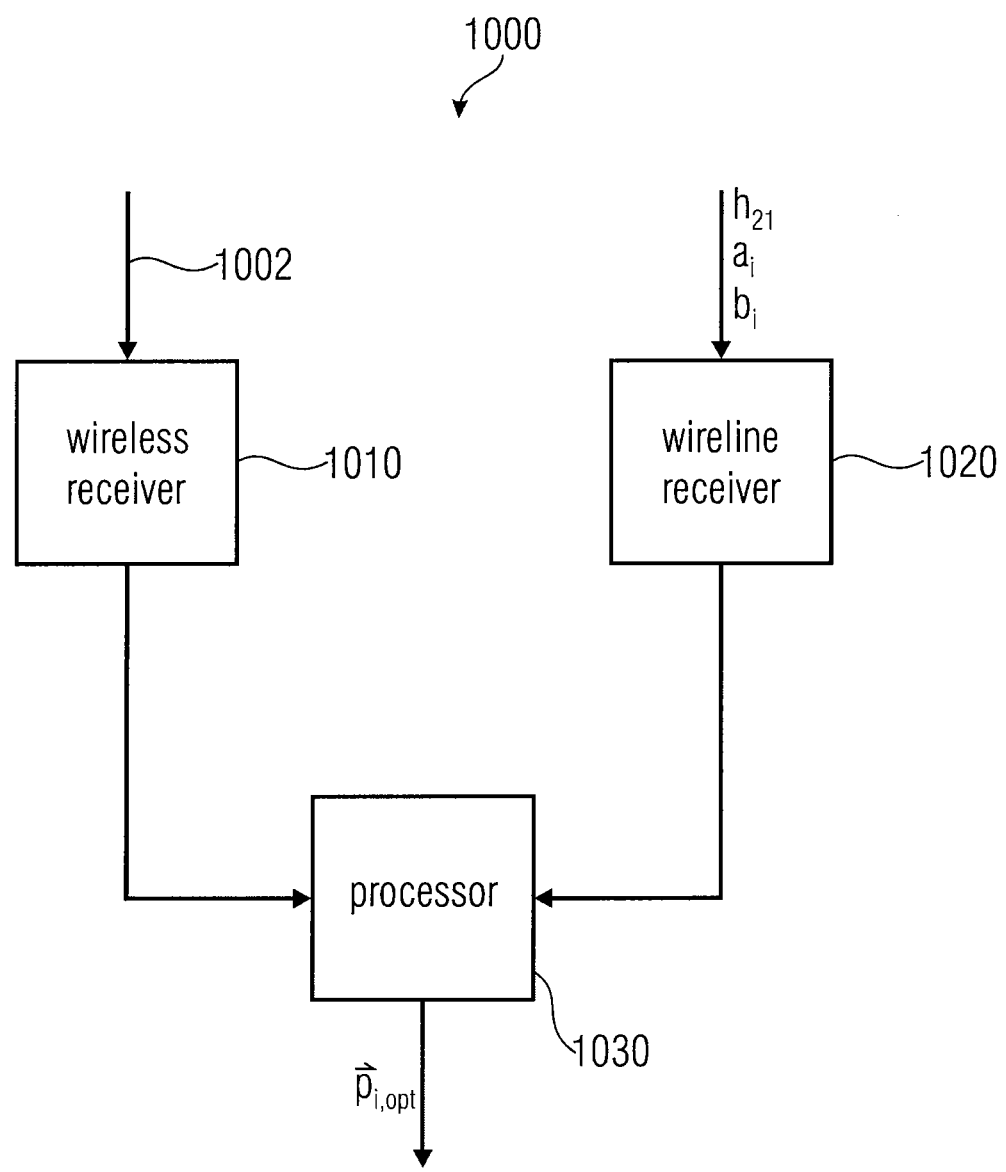
FIG. 10 is a block diagram of an apparatus for determining a precoding vector for precoding data to be transmitted to a wireless device.
Figures 11A, 11B:
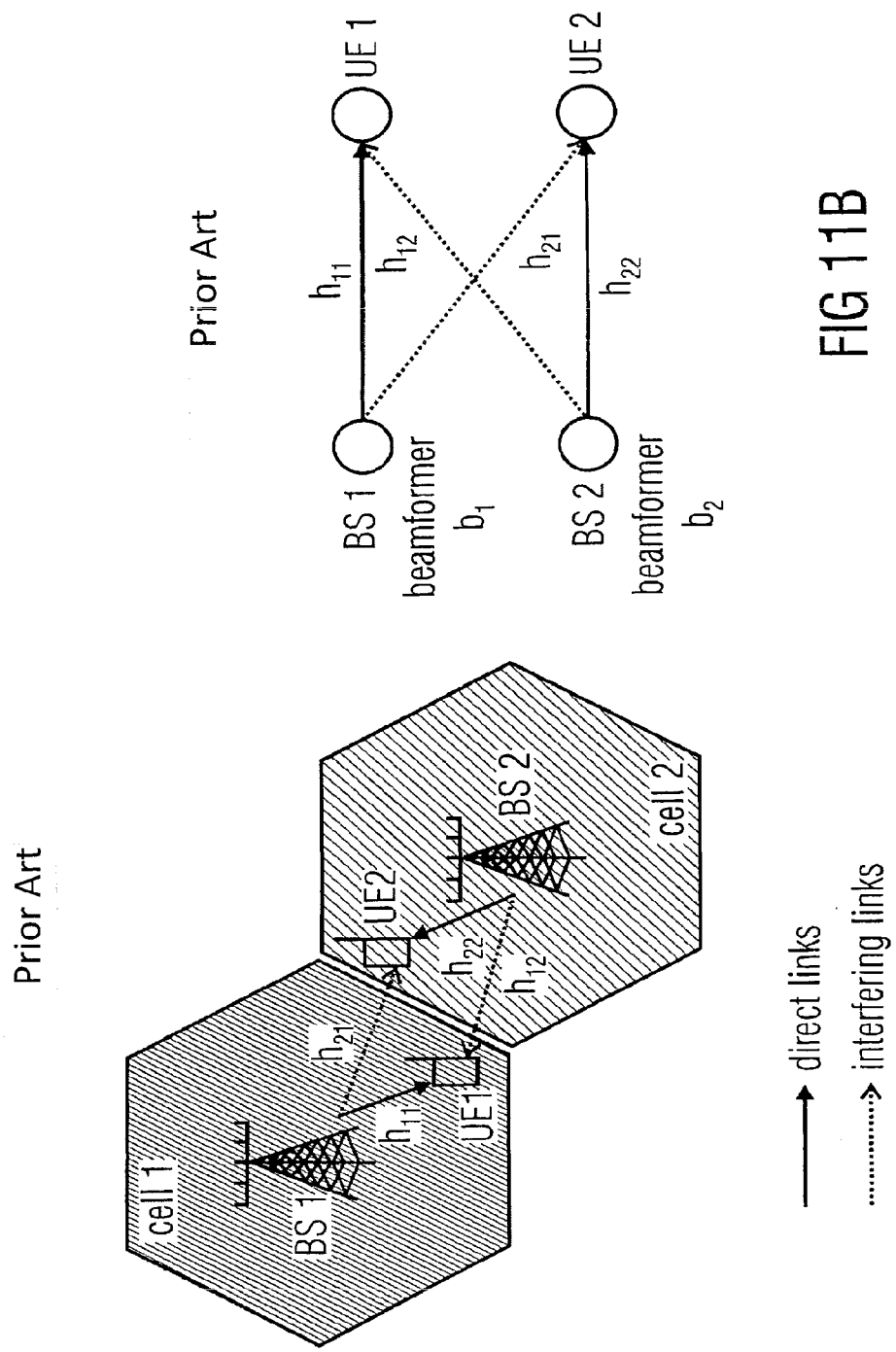
FIG. 11A is a schematic illustration of a 2-cell MISO scenario with cell-edge users representing a system interpretation.
FIG. 11B is a schematic illustration of channels between two base stations and two wireless devices.
Figure 12:
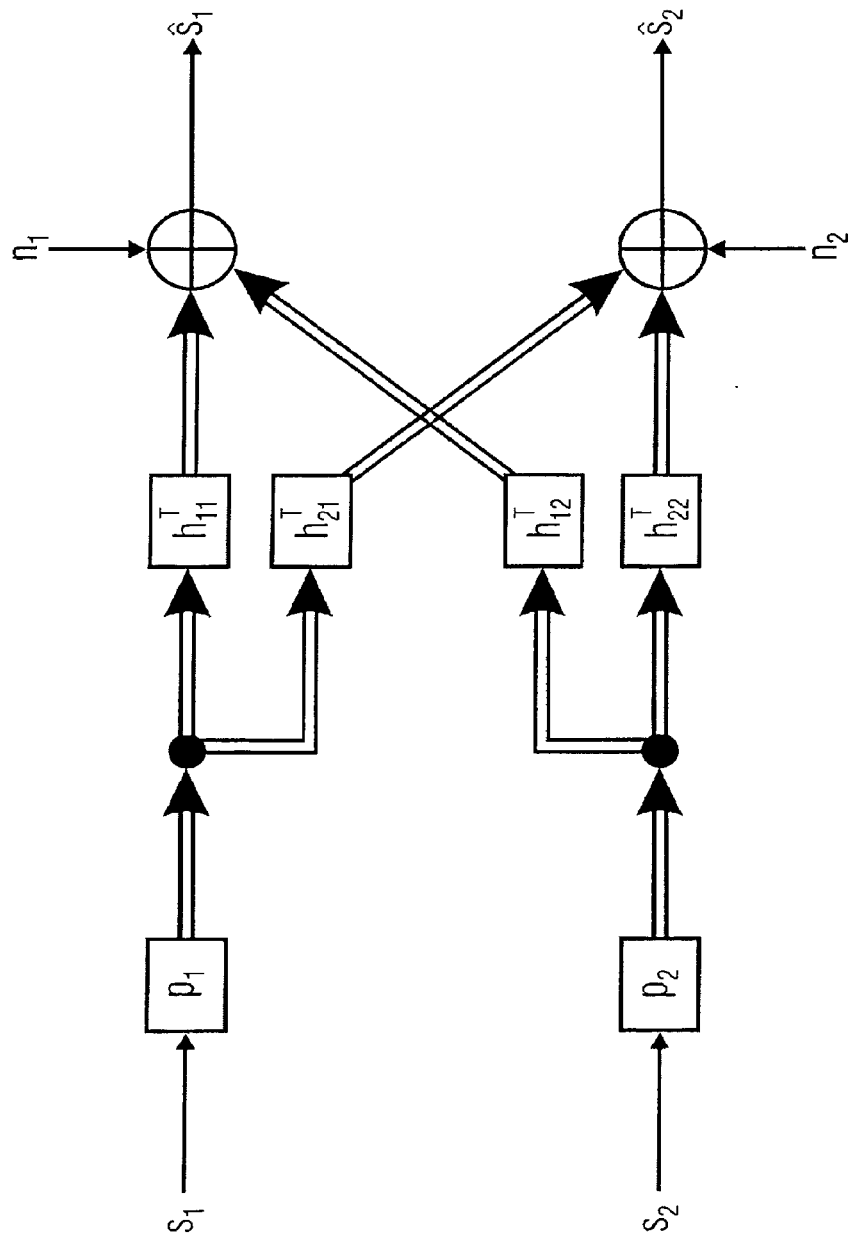
FIG. 12 is a schematic block diagram of a 2-cell MISO scenario representing a theoretical model.
Figure 13:
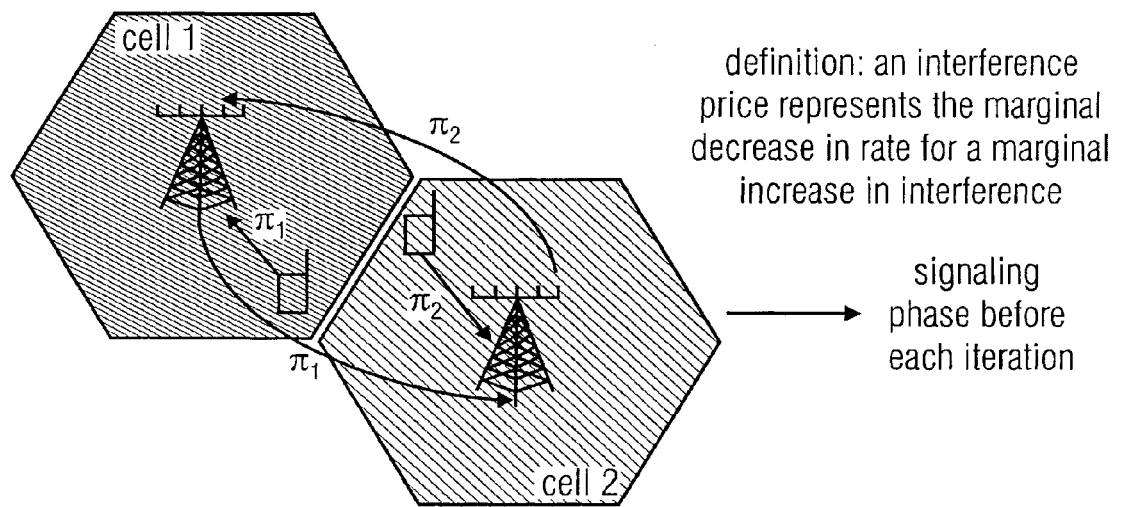
FIG. 13 is a schematic illustration of two cells of a wireless communication system using an interference price based approach.
Figure 14:
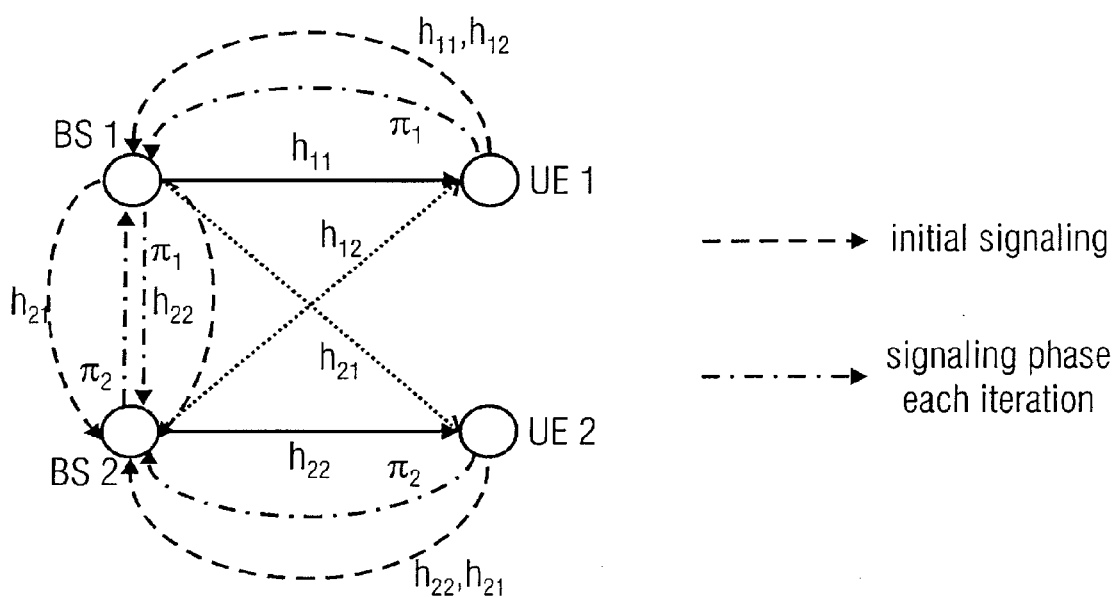
FIG. 14 is a schematic illustration of channels and signals between two base stations and two wireless devices using an interference price based approach.

FIG. 10 shows a block diagram of an apparatus 1000 for determining a precoding vector $p_{i,opt}$ for precoding data to be transmitted to a wireless device in a wireless communication system according to an embodiment of the invention.

The apparatus 1000 comprises a wireless receiver 1010, a wireline receiver 1020 and a processor 1030. The wireless receiver 1010 and the wireline receiver 1020 are connected to the processor 1030. The wireless receiver 1010 is configured to receive a first channel state information 1002 of a channel between a first wireless device and a first base station in a wireless communication system. The first channel state information 1002 is received by the first base station from the first wireless device. The wireline receiver 1020 is configured to receive a first channel gain information $h_{21}$ of a channel between the second wireless device and the first base station. The first channel gain information $h_{21}$ is received from the second base station. Further, the wireline receiver 1020 is configured to receive a first signal strength parameter $b_i$ from the second base station indicating a signal strength at the second wireless device caused by the second base station. The wireline receiver 1020 is further configured to receive a first interference strength parameter $a_i$ from the second base station indicating an interference strength at the first wireless device caused by the second base station. The processor 1030 is configured to obtain a precoding vector $p_{i,opt}$ for precoding data to be transmitted to the first wireless device by maximizing a common signal to interference noise ratio parameter C, $\overline{SINR}$, $\overline{SINR}_{low}$, $\overline{SINR}'$. The common signal to interference noise ratio parameter depends on a signal to interference noise ratio at the first wireless device and a signal to interference noise ratio at the second wireless device and is based on the first channel state information 1002, the first channel gain information $h_{21}$, the first signal strength parameter $b_i$ and the first interference strength parameter $a_i$.

The apparatus 1000 or the components of the apparatus 1000 may comprise one or more additional features or units realizing one or more aspects of the concept described above.

For example, the apparatus 1000 may comprise a precoder for precoding data to be transmitted to the wireless device. Further, the apparatus 1000 may comprise a transmitter for transmitting the precoded data to the wireless device.

The wireless receiver 1010, the wireline receiver 1020, the processor 1030 and/or other optional units of the apparatus 1000 may be independent hardware units or part of a computer, a microcontroller or a digital signal processor as well as a computer program or a software product for running on a computer, a microcontroller or digital signal processor.

Some embodiments of the invention relate to a base station comprising an apparatus for determining a precoding vector as described above. For this, the already existing wireless receiver unit, the wireline receiver unit and the processor of the base station may be used. Further, the precoder and/or the transmitter of the base station may be used.

Implementing the described concept in a plurality of base stations may enable a cooperative optimization of the used precoding vectors at the different base stations to obtain a maximal sum rate for the plurality of base stations and the supplied wireless devices.

Some embodiments of the invention relate to a cooperative rate maximization based on base station exchange of (interference) powers. The new method may be based on an optimization of the sum of cell-edge user rates for the two-cell scenario assuming base station cooperation. The BSs cooperate to maximize the total rate, in comparison to egoistic state-of-the-art methods where each BS egoistically maximizes its own rate. The total rate is first formulated in terms of the base stations' beamformers and the optimal beamformers are iteratively found as follows. At each iteration, one beamformer (say beamformer of BS1) is optimized to maximize a lower bound on the total rate given the knowledge of the other beamformer which is exchanged (say of BS2). In fact, beamformer knowledge is not required as only power levels need to be exchanged. Then, BS2 uses the updated power level information communicated by BS 1 to calculate its own beamformer. This repeats until convergence. Compared with the distributed approach, an additional scalar may be needed to be communicated to each other BS. However, using state-of-the-art methods, interference prices need to be first fed back from receivers to corresponding BSs through the air link. The air link is less reliable; thus, any small inaccuracies in the fed-back interference prices can have a big effect on the obtained state-of-the-art solutions. This also reduces the bandwidth for data transmission on the air link. Some of the examples described before are based on a multiple-input single-output (MISO) scenario; however, the extension to MIMO scenarios is straightforward. Moreover, extension to multicell scenarios is possible, e.g., by either carefully selecting subsets of two cells in the system, or in the context of intra-site CoMP where cooperation is based on a 3 cell scenario.

For example, the proposed method achieves higher rates for cell-edge users in medium to high SNR ranges. The fast convergence of the proposed scheme results in less computational power, which is economically desirable. The proposed scheme may use less signaling between BSs and receivers at the expense of slightly additional signaling between BSs. It doesn't require processing at the receiver side; thus, simple receivers can be used. Moreover, the proposed algorithm is also well-suited for decentralized systems with fast-varying channels, because only limited signaling may be used, keeping in mind that each new iteration necessitates new signaling.

In other words, a new iterative method is proposed in order to achieve higher rates in cellular networks, namely for cell-edge users which suffer from high interference. The proposed approach tries to implicitly mitigate interference by maximizing the total combined rate of such users; thus, it is a cooperative approach. Current state-of-the-art methods try to directly suppress interference or maximize rates separately for each user; such approaches are called egoistic. For example, the new method is a coordinated multi-point (CoMP) scheme where the base stations iteratively exchange interference power information, in contrast to other methods where pricing information calculated at the receiver side is exchanged (limited information about the amount of interference produced by each base station). No joint processing takes place: that is, the base stations (BSs) only cooperate to find their optimal beamformers but they transmit independently, each to its corresponding cell.

For example, the proposed method achieves higher rates for cell-edge users at medium to high signal-to-noise ratios (SNRs). The proposed method may use less signaling between receivers and BSs, at the expense of slightly additional signaling between the BSs. Signaling between receivers and BSs is done via the air link and this reduces the bandwidth for data transmission. Moreover, the air link can be unreliable. On the other hand, signaling between BSs is done via the backhaul link (fiber), where bandwidth is not an issue and signaling is a lot more reliable. Moreover, the proposed scheme doesn't require processing at the receiver side (calculation of pricing information). The fast convergence of the proposed scheme results in overall less computational power. Less computational power results in lower operational expenses at the base station and is economically desirable. Higher rates at cell-edges result in increased revenues, and in case higher rates are not desired, the same rates can be achieved with lower transmit power, which again saves power expenses at BSs. The proposed algorithm is applicable to centralized as well as decentralized systems. Moreover, the proposed algorithm is well-suited for decentralized systems with fast-varying channels, because only limited signaling may be used, keeping in mind that each new iteration necessitates new signaling. State-of-the-solutions necessitate a lot of iterations and thus a lot of signaling.

The described concept may be used in the field of wireless communication, transmission technology, CoMP transmission (coordinated multipoint transmission) and/or cellular networks and may be applicable to cellular multiuser multiple-input multiple-output (MIMO) systems.

A new method for maximizing the rate of cell-edge users based on base station cooperation is proposed. Intercell interference (ICI) is a system bottleneck which severely impacts system performance—especially for cell-edge users—and this results in lower achievable rates. There are many methods in the literature which try to mitigate interference using different approaches: some try to directly suppress interference while others maximize rates separately for each user, therefore being egoistic approaches. The proposed scheme implicitly tries to mitigate interference by maximizing the total combined rate of edge users; thus, it is a cooperative approach. A two-cell multiple-input single-output (MISO) scenario with single user cells is considered, where the base stations (BS) alternately exchange interference power information in order to maximize a lower bound on the total rate. Numerical results show performance improvements for medium and high signal-to-noise (SNR) ratios over state-of-the-art methods. Moreover, the proposed scheme has a fast convergence rate which makes it even more attractive for time-varying systems where only a limited number of iterations can be afforded.

In other words, the proposed concept provides, for example, an algorithm with fast conversions, lower necessitated computation power and low computational complexity, less processing at the receiver side, a reduced communication on the air link, a good adaptivity to fast varying systems and/or also a counteract to increased complexity by lower bounding C (sum rate).

Compared to known concepts, the proposed scheme may use more signaling between the base stations (via backhaul link), but significantly less signaling between base stations and receivers (via air link) and less or no processing at the receivers. Further, the proposed concept may comprise a high convergence speed, involves low computational effort and comprises a good adaptivity to fast varying scenarios compared to known concepts.

The increased cell-edge rates due to the proposed concept may cause increased revenues. Further, the lower computation effort may result in lower operational expenses at the base stations.

With known concepts, the system total rate cannot be optimized by joint beamforming design of cooperating base stations. In other words, the known methods do not optimize the system total rate. In comparison, the proposed method can iteratively optimize the system total rate subject to power measures (e.g. signal strength and interference strength) from neighboring cells (neighboring base stations). The powers may be measured at the base station and exchanged over the backhaul (per iteration, no signaling over the air link may be necessary). This concept can provide a method to maximize the system total rate in a signaling efficient way.

Known approaches are egoistic (subject to penalties). In comparison, the proposed method can tackle the problem in a new altruistic (cooperative) approach. Each base station tries to maximize the total rate (sum or rates of both users) at once.

It may be one goal to find optimal beamformers (precoding vectors) that maximize the total rate (e.g. FIG. 2).

Given $S_2$ and $I_2$, base station 1 BS1 can find an optimal beamformer $b_1$ that maximizes C, for example. This is similarly done for the base station BS2. Since the optimal beamformers (and thus S and I quantities) are not known, the algorithm may start with initial beamformers and iterates until convergence. The increased complexity may be reduced by lower bounding C (the sum rate).

Some embodiments according to the invention relate to a method aiming to maximize the rates of cell-edge users in wireless cellular networks by solving a total rate maximization problem assuming base station cooperation.

Optionally, the method may further comprise an iterative procedure based on exchange of (interference) powers between the base station in order to calculate the optimal beam forming vectors.

According to another aspect, the iteration procedure is performed in a distributed way over the base stations, requiring signaling over the backhaul connecting the base stations.

According to another aspect, a lower bound of the total rate of cell-edge users instead of the exact rate is maximized at each iteration.

Although some aspects of the described concept have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

What is claimed is:

1. A method for determining a precoding vector for precoding data to be transmitted to a wireless device in a wireless communication system, comprising:

receiving first channel state information of a channel between a first wireless device and a first base station in the wireless communication system, wherein the first channel state information is received by the first base station from the first wireless device;

receiving first channel gain information of a channel between a second wireless device and the first base station, wherein the first channel gain information is received from a second base station;

receiving a first signal strength parameter from the second base station indicating a signal strength at the second wireless device caused by the second base station;

receiving a first interference strength parameter from the second base station indicating an interference strength at the first wireless device caused by the second base station; and maximizing a common signal to interference noise ratio parameter to acquire a precoding vector for precoding data to be transmitted to the first wireless device, wherein the common signal to interference noise ratio parameter depends on a signal to interference noise ratio at the first wireless device and a signal to interference noise ratio at the second wireless device and is based on the first channel state information, the first channel gain information, the first signal strength parameter and the first interference strength parameter.

2. The method according to claim 1, further comprising:
receiving second channel state information of a channel between the first wireless device and a second base station in the wireless communication system, wherein the second channel state information is received by the first base station from the first wireless device;

calculating a second channel gain information of the channel between the first wireless device and the second base station based on the second channel state information; and transmitting the second channel gain information to the second base station.

3. The method according to claim 2, wherein the first channel state information and the second channel state information are received through a wireless channel from the first wireless device, wherein the first channel gain information, the first signal strength parameter and the first interference strength parameter are received through a wireline channel from the second base station.

4. The method according to claim 1, further comprising:
calculating a second signal strength parameter indicating a signal strength at the first wireless device caused by the first base station;

calculating a second interference strength parameter indicating an interference strength at the second wireless device caused by the first base station; and transmitting the second signal strength parameter and the second interference strength parameter to the second base station.

5. The method according to claim 4, further comprising:
receiving a third signal strength parameter from the second base station, wherein the third signal strength parameter is calculated by the second base station based on the transmitted second signal strength parameter and the transmitted second interference strength parameter, wherein the third signal strength parameter indicates a signal strength at the second wireless device caused by the second base station under consideration of the transmitted second signal strength parameter and the transmitted second interference strength parameter;

receiving a third interference strength parameter from the second base station, wherein the third interference strength parameter is calculated by the second base station based on the transmitted second signal strength parameter and the second interference strength parameter, wherein the third interference strength parameter indicates an interference strength at the first wireless device caused by the second base station under consideration of the transmitted second signal strength parameter and the transmitted second interference strength parameter; and maximizing the common signal to interference noise ratio parameter to acquire a new precoding vector, wherein the common signal to interference noise ratio parameter is based on the first channel state information, the first channel gain information, the third signal strength parameter and the third interference strength parameter, so that the precoding vector is optimized iteratively.

6. The method according to claim 1, wherein the common signal to interference noise ratio parameter represents a sum rate of the first wireless device and the second wireless device, a common signal to interference noise ratio at the first wireless device and the second wireless device or a lower bound of a common signal to interference noise ratio at the first wireless device and the second wireless device.

7. The method according to claim 6, wherein the common signal to interference noise ratio is defined by $$\overline{SINR} = SINR_1 + SINR_2 + SINR_1 SINR_2$$

wherein $SINR_1$ is a signal to interference noise ratio at the first wireless device and $SINR_2$ is a signal to interference noise ratio at the second wireless device.

8. The method according to claim 6, wherein the lower bound of the common signal to interference noise ratio is defined by $$\overline{SINR} = \frac{p_i^H A_i p_i p_i^H B_i p_i + 1 + p_i^H A_i p_i}{p_i^H B_i p_i}$$

$$\geq \frac{p_i^H \left( \frac{\sigma_j^2}{b_i} A_i + \frac{1}{E_{tx_i}} I_M + A_i \right) p_i}{p_i^H B_i p_i}$$

$$= \frac{p_i^H \left( \left(1 + \frac{\sigma_j^2}{b_i}\right) A_i + \frac{1}{E_{tx_i}} I_M \right) p_i}{p_i^H B_i p_i}$$

$$= \frac{p_i^H D_{low,i} p_i}{p_i^H B_i p_i}$$

$$= \overline{SINR}_{low},$$

with $$A_i = \frac{h_{ii}^* h_{ii}^T}{a_i}$$

$$B_i = \frac{h_{ji}^* h_{ji}^T + \frac{\sigma_j^2}{E_{tx_i}} I_M}{b_i},$$

and $$a_i = |h_{ij}^T p_j|^2 + \sigma_i^2$$

$$b_i = |h_{jj}^T p_j|^2,$$

wherein $\overline{SINR}$ is a common signal to interference noise ratio, index i and j are equal to 1 or 2 with i being unequal to j, $p_i$, $p_j$ are precoding vectors of the first base station or the second base station, $h_{ii}$, $h_{ij}$, $h_{ji}$ and $h_{jj}$ are channel gain information of a channel between a base station and a wireless device, $\sigma_i^2$ is the noise power, $I_M$ is the identity matrix of size M, $E_{tx_i}$ is the transmit power, $a_i$ is an interference strength parameter, $b_i$ is a signal strength parameter, and $D_{low}$ is a matrix.

9. The method according to claim 6, wherein the lower bound of the common signal to interference ratio is defined by $$\overline{SINR'} = \frac{1}{p_i^H B_i p_i} + \frac{p_i^H A_i p_i}{p_i^H B_i p_i}$$

$$= \frac{p_i^H \left(A_i + \frac{1}{E_{tx_i}} I_M\right) p_i}{p_i^H B_i p_i}$$

$$= \frac{p_i^H D_i' p_i}{p_i^H B_i p_i},$$

with $$A_i = \frac{h_{ii}^* h_{ii}^T}{a_i}$$

$$B_i = \frac{h_{ji}^* h_{ji}^T + \frac{\sigma_j^2}{E_{tx_i}} I_M}{b_i},$$

and $$a_i = |h_{ij}^T p_j|^2 + \sigma_i^2$$

$$b_i = |h_{jj}^T p_j|^2$$

wherein $\overline{SINR'}$ is a common signal to interference noise ratio, index i and j are equal to 1 or 2 with i being unequal to j, $p_i$, $p_j$ are precoding vectors of the first base station or the second base station, $h_{ii}$, $h_{ij}$, $h_{ji}$ and $h_{jj}$ are channel gain information of a channel between a base station and a wireless device, $\sigma_i^2$ is the noise power, $I_M$ is the identity matrix of size M, $E_{tx_i}$ is the transmit power, $a_i$ is an interference strength parameter, $b_i$ is a signal strength parameter, and $D'_i$ is a matrix.

10. The method according to claim 1, wherein the first signal strength parameter is defined by $$b_i = |h_{jj}^T p_j|^2$$

wherein index i and j are equal to 1 or 2 with i being unequal to j, $p_j$ is a precoding vector of the first base station or the second base station and $h_{jj}$ is channel gain information of a channel between a base station and a wireless device.

11. The method according to claim 1, wherein the first interference strength parameter is defined by $$a_i |h_{ij}^T p_j|^2 + \sigma_i^2$$

wherein index i and j are equal to 1 or 2 with i being unequal to j, $p_j$ is a precoding vector of the first base station or the second base station, $h_{ij}$ is channel gain information of a channel between a base station and a wireless device and $\sigma_i^2$ is the noise power.

12. The method according to claim 1, wherein the maximization is done by solving a generalized eigenvector vector problem, wherein the precoding vector for precoding data is the eigenvector corresponding to the maximum generalized eigenvalue of matrices depending on the first channel state information, the first channel gain information, the first signal strength parameter and the first interference strength parameter.

13. The method according to claim 12, wherein the generalized eigenvector problem to be solved is $$D_{low,i} p_{i,opt} = \lambda_{max} B_i p_{i,opt}$$

wherein $D_{low,i}$ is defined by $$\overline{SINR} = \frac{p_i^H A_i p_i p_i^H B_i p_i + 1 + p_i^H A_i p_i}{p_i^H B_i p_i}$$

$$\geq \frac{p_i^H \left(\frac{\sigma_j^2}{b_i} A_i + \frac{1}{E_{tx_i}} I_M + A_i\right) p_i}{p_i^H B_i p_i}$$

$$= \frac{p_i^H \left(\left(1 + \frac{\sigma_j^2}{b_i}\right) A_i + \frac{1}{E_{tx_i}} I_M\right) p_i}{p_i^H B_i p_i}$$

$$= \frac{p_i^H D_{low,i} p_i}{p_i^H B_i p_i}$$

$$= \overline{SINR}_{low},$$

with $$A_i = \frac{h_{ii}^* h_{ii}^T}{a_i}$$

$$B_i = \frac{h_{ji}^* h_{ji}^T + \frac{\sigma_j^2}{E_{tx_i}} I_M}{b_i},$$

$$a_i = |h_{ij}^T p_j|^2 + \sigma_i^2$$

$$b_i = |h_{jj}^T p_j|^2$$

wherein $\overline{SINR}$ is a common signal to interference noise ratio, index i and j are equal to 1 or 2 with i being unequal to j, $p_i$, $p_j$ are precoding vectors of the first base station or the second base station, $h_{ii}$, $h_{ij}$, $h_{ji}$ and $h_{jj}$ are channel gain information of a channel between a base station and a wireless device, $\sigma_i^2$ is the noise power, $I_M$ is the identity matrix of size M, $E_{tx_i}$ is the transmit power, $a_i$ is an interference strength parameter, $b_i$ is a signal strength parameter, $p_{i,opt}$ is an optimum precoding vector of the generalized eigenvector problem, and $\lambda_{max}$ is the maximum generalized eigenvalue.

14. An apparatus for determining a precoding vector for precoding data to be transmitted to a wireless device in a wireless communication system, the apparatus comprising:
a wireless receiver configured to receive a first channel state information of a channel between a first wireless device and a first base station in the wireless communication system, wherein the first channel state information is received by the first base station from the first wireless device;
a wireline receiver configured to receive a first channel gain information of a channel between the second wireless device and the first base station, wherein the first channel gain information is received from a second base station, wherein the wireline receiver is configured to receive a first signal strength parameter from the second base station indicating a signal strength at the second wireless device caused by the second base station, wherein the wireline receiver is further configured to receive a first interference strength parameter from the second base station indicating an interference strength at the first wireless device caused by the second base station; and
a processor configured to acquire a precoding vector for precoding data to be transmitted to the first wireless device by maximizing a common signal to interference noise ratio parameter, wherein the common signal to interference noise ratio parameter depends on a signal to interference noise ratio at the first wireless device and a signal to interference noise ratio at the second wireless device and is based on the first channel state information, the first channel gain information, the first signal strength parameter and the first interference strength parameter.

15. A non-transitory storage medium having stored thereon a computer program with a program code for performing a method for determining a precoding vector for precoding data to be transmitted to a wireless device in a wireless communication system, said method comprising:

receiving first channel state information of a channel between a first wireless device and a first base station in the wireless communication system, wherein the first channel state information is received by the first base station from the first wireless device;

receiving first channel gain information of a channel between a second wireless device and the first base station, wherein the first channel gain information is received from a second base station;

receiving a first signal strength parameter from the second base station indicating a signal strength at the second wireless device caused by the second base station;

receiving a first interference strength parameter from the second base station indicating an interference strength at the first wireless device caused by the second base station; and maximizing a common signal to interference noise ratio parameter to acquire a precoding vector for precoding data to be transmitted to the first wireless device, wherein the common signal to interference noise ratio parameter depends on a signal to interference noise ratio at the first wireless device and a signal to interference noise ratio at the second wireless device and is based on the first channel state information, the first channel gain information, the first signal strength parameter and the first interference strength parameter, when the computer program runs on a computer or a microcontroller.

* * * * *